United States Patent
Borella et al.

(10) Patent No.: US 6,948,074 B1
(45) Date of Patent: Sep. 20, 2005

(54) METHOD AND SYSTEM FOR DISTRIBUTED GENERATION OF UNIQUE RANDOM NUMBERS FOR DIGITAL TOKENS

(75) Inventors: Michael S. Borella, Naperville, IL (US); David Grabelsky, Skokie, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/521,788

(22) Filed: Mar. 9, 2000

(51) Int. Cl.[7] .............................................. H04L 9/00
(52) U.S. Cl. ..................................... 713/201; 713/168
(58) Field of Search ................................ 713/153, 201, 713/168; 709/223, 228

(56) References Cited

U.S. PATENT DOCUMENTS

| | | | | |
|---|---|---|---|---|
| 4,633,037 A | * | 12/1986 | Serpell ........................ | 705/71 |
| 4,953,198 A | | 8/1990 | Daly et al. .................... | 379/61 |
| 5,029,208 A | * | 7/1991 | Tanaka ........................ | 380/279 |

(Continued)

FOREIGN PATENT DOCUMENTS

WO    WO 01/31888 A1    5/2001    ........... H04L 29/06

OTHER PUBLICATIONS

Menezes, Alfred J.; Oorschot, Paul C van; Vanstone, Scott A.; Handbook of Applied Cryptography, 1997, CRC Press LLC, pp. 524-525.*

(Continued)

Primary Examiner—Gregory Morse
Assistant Examiner—Ellen Tran
(74) Attorney, Agent, or Firm—McDonnell Boehnen Hulbert & Berghoff LLP

(57) ABSTRACT

A method and system for distributed generation of unique random numbers. The unique random number can be used to create digital cookies or digital tokens. A first network device (e.g., a computer) on a computer network receives an x-bit bit mask template from a second network device on the computer network (e.g., a gateway). The first network device generates a first portion of an x-bit digital cookie. The first network device requests a second portion of the x-bit digital cookie from the second network device. The request includes the first portion of the x-bit digital cookie. The first network device generates a complete x-bit digital cookie using the first portion of the x-bit digital cookie generated by the first network device and the second portion of the x-bit digital cookie generated by the second network device. The generated complete x-bit digital cookie is not in use on the computer network because the second network device has selected the second portion of the bit mask so the complete x-bit digital cookie including the first portion generated on the first network device and the second portion generated on the second network device is not use on the computer network. The method and system can be used on a Distributed Network Address Translation ("DNAT") or a Realm Specific Internet Protocol ("RSIP") subnet to allow a network device (e.g., a computer) to create a complete x-bit digital cookie with help from a DNAT/RSIP gateway. The complete x-bit digital cookie can be used as a 64-bit anti-clogging cookie for security protocols such as Internet Key Exchange ("IKE") protocol exchanges used with Internet Protocol security ("IPsec").

27 Claims, 9 Drawing Sheets

U.S. PATENT DOCUMENTS

| | | | |
|---|---|---|---|
| 5,159,592 A | 10/1992 | Perkins | 370/85.7 |
| 5,227,778 A | 7/1993 | Vacon et al. | 340/825.52 |
| 5,327,365 A | 7/1994 | Fujisaki et al. | |
| 5,497,339 A | 3/1996 | Bernard | 364/705.5 |
| 5,526,353 A | 6/1996 | Henley et al. | 370/60.1 |
| 5,526,489 A | 6/1996 | Nilakantan et al. | 395/200.02 |
| 5,535,276 A * | 7/1996 | Ganesan | 713/155 |
| 5,550,984 A | 8/1996 | Gelb | 395/200.17 |
| 5,604,737 A | 2/1997 | Iwami et al. | 370/352 |
| 5,606,594 A | 2/1997 | Register et al. | 379/58 |
| 5,636,216 A | 6/1997 | Fox et al. | 370/402 |
| 5,654,957 A | 8/1997 | Koyama | 370/355 |
| 5,708,655 A | 1/1998 | Toth et al. | 370/313 |
| 5,717,756 A * | 2/1998 | Coleman | 713/155 |
| 5,737,333 A | 4/1998 | Civanlar et al. | 370/352 |
| 5,737,419 A * | 4/1998 | Ganesan | 713/169 |
| 5,742,596 A | 4/1998 | Baratz et al. | 370/356 |
| 5,754,547 A | 5/1998 | Nakazawa | 370/401 |
| 5,793,657 A | 8/1998 | Nemoto | |
| 5,793,763 A | 8/1998 | Mayes et al. | 370/389 |
| 5,812,819 A | 9/1998 | Rodwin et al. | 395/500 |
| 5,835,723 A | 11/1998 | Andrews et al. | 395/200.56 |
| 5,862,331 A | 1/1999 | Herriot | 395/200.49 |
| 5,867,495 A | 2/1999 | Elliott et al. | 370/352 |
| 5,867,660 A | 2/1999 | Schmidt et al. | 395/200.57 |
| 5,872,847 A | 2/1999 | Boyle et al. | 380/25 |
| 5,889,774 A | 3/1999 | Mirashrafi et al. | 370/352 |
| 5,892,924 A | 4/1999 | Lyon et al. | 395/200.75 |
| 5,915,008 A | 6/1999 | Dulman | 379/201 |
| 5,933,778 A | 8/1999 | Buhrmann et al. | 455/461 |
| 5,950,195 A | 9/1999 | Stockwell et al. | 707/4 |
| 6,011,782 A | 1/2000 | DeSimone et al. | 370/260 |
| 6,055,236 A | 4/2000 | Nessett et al. | 370/389 |
| 6,055,561 A | 4/2000 | Feldman et al. | 709/200 |
| 6,058,421 A | 5/2000 | Fijolek et al. | 709/225 |
| 6,079,021 A | 6/2000 | Abadi et al. | 713/202 |
| 6,101,189 A | 8/2000 | Tsuruoka | 370/401 |
| 6,101,543 A | 8/2000 | Alden et al. | 709/229 |
| 6,104,711 A | 8/2000 | Voit | 370/352 |
| 6,115,751 A | 9/2000 | Tam et al. | 709/240 |
| 6,134,591 A | 10/2000 | Nickles | 709/229 |
| 6,137,791 A | 10/2000 | Frid et al. | 370/352 |
| 6,157,950 A | 12/2000 | Krishnan | 709/223 |
| 6,172,986 B1 | 1/2001 | Watanuki et al. | 370/466 |
| 6,185,184 B1 | 2/2001 | Mattaway et al. | 370/230 |
| 6,195,705 B1 | 2/2001 | Leung | 709/245 |
| 6,212,183 B1 | 4/2001 | Wilford | 370/392 |
| 6,212,563 B1 | 4/2001 | Beser | 709/227 |
| 6,249,820 B1 | 6/2001 | Dobbins et al. | 709/238 |
| 6,266,707 B1 | 7/2001 | Boden et al. | 709/245 |
| 6,269,099 B1 | 7/2001 | Borella et al. | 370/389 |
| 6,353,614 B1 | 3/2002 | Borella et al. | 370/389 |
| 6,353,891 B1 | 3/2002 | Borella et al. | 713/201 |

OTHER PUBLICATIONS

Huitema, Christian; IPv6: The New Internet Protocol, 1996, Prentice Hall PTR, pp. 97-122.*

Simpson, W. A.; Photuris: Secret Exchange, May 1998.*

Karn, P.; Simpson, W.; Photuris: Session-Key Management Protocol, Network Working Group RFC2522.*

Harkins, D.; Carrel, D.; "The Internet Key Exchange (IKE)", Nov. 1998, Network Working Group, RFC: 2409.*

Montenegro, G, Borella, M., RSIP Support for End-to-end IPSEC, Oct. 29, 1999, Internet Engineering Task Force, http://www.ietf.org/proceedings/99nov/1-D/draft-ietf-nat-rsip-ipsec-01.txt.*

G. Montene, Internet Engineering Task Force, Internet Draft, "Negotiated Address Reuse" (NAR), <draft-montenegro-aatn-nar-00.txt>, May 1998, pp. 1 to 22.

George Tsirtsis, Alan O'Neill, Internet Engineering Task Force, Internet Draft, "NAT Bypass for End 2 End 'Sensitive' Applications," <draft-tsirtsis-nat-bypass-00.txt>, Jan. 1998, pp. 1 to 5.

George Tsirtsis, Pyda Srishuresh, Internet Engineering Task Force, Internet Draft, "Network Address Translation—Protocol Translation" (NAT-PT), <draft-ietf-ngtrans-natpt-04.txt>, Jan. 1999, pp. 1 to 13.

Jeffrey Lo, K. Taniguchi, Internet Engineering Task Force, Internet Draft, "IP Host Network Address (and port) Translation," <draft-ietf-nat-hnat-00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft-borella-aatn-dnat-01.txt>, Oct. 1998, pp. 1 to 21.

P. Srisuresh, G. Tsirtsis, P. Akkiraju, A. Heffernan, Internet Engineering Task Force, Internet Draft, "DNS Extensions to Network Address Translators"(DNS_ALG), <draft-ietf-nat-dns-alg-01.txt>, Oct. 1998, pp. 1 to 24.

P. Srisuresh, Internet Engineering Task Force, Internet Draft "Security for IP Network Address Translator (NAT) Domains," <draft-ietf-nat-security-00.txt.>, Nov. 1998, pp. 1 to 11.

P. Srisuresh, K. Eg, Internet Engineering Task Force, Internet Draft, "The IP Network Address Translator" (NAT), <draft-rfced-info-srisuresh-05.txt>, Feb. 1998, pp. 1 to 24.

P. Srisuresh, K. Egev, Internet Engineering Task Force, Internet Draft, "Traditional IP Network Address Translator (Traditional NAT)," <draft-ietf-nat-traditional-01.txt>, Oct. 1998, pp. 1 to 17.

P. Srisuresh, Matt Holdrege, Internet Engineering Task Force, Internet Draft, "IP Network Address Translator (NAT) Terminology and Considerations," <draft-ietf-nat-terminology-01.txt>, Oct. 1998, pp. 1 to 28.

Praveen Akkiraju, Yakov Rekhter, Internet Engineering Task Force, Internet Draft, "A Multihoming Solution Using NATs" <draft-akkiraju-nat-multihoming-00.txt>, Nov. 1998, pp. 1 to 32.

R. G. Moskowitz, Internet Engineering Task Force, Internet Draft, "Network Address Translation Issues with IPsec," <draft-moskowitz-net66-vpn-00.txt>, Feb. 6, 1998, p. 1 to 8.

R. Thay, N. Doraswa and R. Gle, Internet Engineering Task Force, Internet Draft "IP Security," <draft-ietf-ipsec-doc-roadmap-02.txt.>, Nov. 1997, pp. 1 to 12.

T. Hain, Internet Engineering Task Force, Internet Draft, "Architectural Implications of NAT," <draft-iab-nat-implications-02.txt>, Oct. 1998, pp. 1 to 14.

W.T. Teo, S.W. Yeow, R. Singh, Internet Engineering Task Force, Internet Draft, "IP Relocation Through Twice Network Address Translators," <draft-ietf-nat-rnat-00.txt>, Feb. 1999, pp. 1 to 20.

W.T. Teo, S.W. Yeow, R. Singh, Internet Engineering Task Force, Internet Draft, "Reverse Twice Network Address Translators" (RAT), <draft-teoyeow-mip-rat-01.txt>, Dec. 1998, pp. 1 to 20.

W.T. Teo, Y. Li, Internet Engineering Task Force, Internet Draft, "Mobile IP Extension for Private Internets Support," <draft-teoyli-mobileip-mvpn-02.txt>, Feb. 1999, pp. 1 to 24.

Yakov Rekhter, Internet Engineering Task Force, Internet Draft, "Implications of NATs on the TCP/IP Architecture," <draft-ietf-nat-arch-implications-00.txt>, Feb. 1999, pp. 1 to 7.

K. Egevang, and P. Francis, Internet Engineering Task Force, ("IETF"), Request for Comments ("RFC") RFC-1631, "The IP Network Address Translator (NAT)", May 1994, pp. 1-10.

Borella, Michael, *Technology Update—Protocol Helps Stretch IPv4 Addresses,* "Network World", vol. 17, No. 3, Jan. 17, 2000, p. 43.

Kent, Stephen, *Evaluating Certification Authority Security,* Aerospace Conference, 1998 IEEE, Online, vol. 4, pp. 319-327 (Mar. 21-23, 1998).

Thayer, Rodney, *Bulletproof IP With Authentication and Encryption IPSec Adds a Layer of Armor to IP,* Data Communications, vol. 26, No. 16, pp. 55-58, 60 (Nov. 21, 1997).

Borella, M., Grabelsky, D., Lo, J., Tuniguchi, K., Internet Engineering Task Force, Internet Draft, "Realm Specific IP: Protocol Specification <draft-ietf-nat-rsip-protocol-.06.txt>", Mar. 2000, pp. 1-48.

Borella, M., Grabelsky, D., Lo, J., Tuniguchi, K., Internet Engineering Task Force, Internet Draft, "Realm Specific IP: Protocol Specification <draft-ietf-nat-rsip-protocol-.07.txt>", Jul. 2000, pp. 1-49.

Montenegro, G., Internet Engineering Task Force, Internet Draft, "RSIP Support for End-to-End IPsec," <draft-ietf-nat-rsip-ipsec-04.txt>, Jul. 2000, pp. 1 to 17.

Borella, M., Lo, J., Grabelsky, D., Montenegro, G., Internet Engineering Task Force, Internet Draft, "Realm Specific IP: Framework <draft-ietf-nat-rsip-framework-.05.txt>", Jul. 2000, pp. 1-30.

Borella, M., Montenegro, G., *RSIP: Address Sharing with End-To-End Security,* USENIX Conference, San Francisco, California, Mar. 9, 2000, pp. 1-9.

Handley, M., et al. *SIP: Session Initiation Protocol,* Network Working Group, Request for Comments 2543, Mar. 1999, pp. 1 to 153.

ITU-T Recommendation H.225.0, *Call Signaling Protocols and Media Stream Packetization for Packet-Based Multimedia Communication Systems,* Series H: Audiovisual and Multimedia Systems—Infrastructure of Audiovisual Services—Transmission Multiplexing and Synchronization, (Feb., 1998).

ITU-T Recommendation H.323, *Packet-Based Multimedia Communications Systems,* Series H: Audiovisual and Multimedia Systems—Infrastructure of Audiovisual Services—Systems and Terminal Equipment for Audiovisual Services, (Feb., 1998).

McCanne et al., "The BSD Packet Filter: A New Architecture for User-Level Packet Capture," Proceedings of the 1993 Winter USENIX Technical Conference (Jan. 1993).

Postel, J., *User Datagram Protocol,*Request for Comments 768, Aug. 1980, pp. 1 to 3.

Postel, J., *Internet Protocol,* Request for Comments 791, Sep. 1981, pp. 1 to 45.

Postel J., *Internet Control Message Protocol,* Request for Comments 792, Sep. 1981, pp. 1 to 21.

Postel, J., *Transmission Control Protocol,* Request for Comments 793, Sep. 1981, pp. i to 84.

Postel, J., *File Transfer Protocol (FTP),* Request for Comments 959, Oct. 1985, pp. 1 to 69.

Jacobson, V., *TCP Extensions for High Performance,* Request for Comments 1323, May 1992, pp. 1 to 37.

Droms, R., *Dynamic Host Configuration Protocol,* Request for Comments 2131, Mar. 1997, pp. 1 to 45.

Stevens, W., *Advanced Sockets API for IPv6,* Request for Comments 2292, Feb. 1998, pp. 1 to 67.

Gilligan, R. et al., *Basic Socket Interface Extensions for IPv6,* Request for Comments 2553, Mar. 1999, pp. 1 to 41.

Srisuresh, P.,et al., *IP Network Address Translator (NAT) Terminology and Considerations,* Request for Comments 2663, Aug. 1999, pp. 1 to 30.

Maurice J. Bach, The Design of the Unix Operating System, Prentice Hall Software Series, 1986, pp. 382-390.

"Cisco IOS Release 12.0 Network Protocols Configuration Guide, Part 1", Configuring IP Addressing, Cisco Systems, 1998, pp. PIC-7 to PIC-58.

Durand, Alain, *Deploying Ipv6,* IEEE Internet Computing, http://computer.org/internet, Jan.-Feb. 2001, pp. 79-81.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A., Stiel, Herb; and Gargiulo, Robert, Collaboration Using Multiple PDAs Connected to a PC, Proceedings of the ACM 1998 conference on Computer supported cooperative work, Nov. 14-18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a Sip-Based IP Telephony System, *IEEE Communications Magazine,* vol. 37, No. 7, Jul. 1999, pp. 96-101. (8 total pages).

Handley/Schulzrinne/Schooler/Rosenberg, SIP: Session Initiation Protocol, Internet Engineering Task Force, draft-ietf-sip-rfc2543bis-02.ps. Sep. 4, 2000. (131 pages).

Borella, M., Lo, J., Grabelsky, D., Montenegro, G., IETF Proceedings presentation, Realm Specific IP: Protocol Specification <draft-nat-rsip-protocol-00.txt>, Apr. 9, 1999 (13 pages).

Marsan, Carolyn Duffy, The Next Best Things to Ipv6? Network World Fusion at http://www.nbwfusion.com/news/1999/0920ipv6.html, Mar. 29, 2000, pp. 1-3.

Borella, M., Lo, J., Grabelsky, D., Montenegro, G., Internet Engineering Task Force, Internet Draft, "Realm Specific IP: Framework <draft-ietf-nat-rsip-framework-.04.txt>", Mar. 2000, pp. 1-30.

IETF Mar. 1999 Proceedings, 2.7.10 Network Address Translators (nat), pp. 1-13.

Rosenberg, Jonathan D. and Shockey, Richard, The Session Initiation Protocol (SIP): A Key Component for Internet Telephony, ComputerTelephony.com, Jun. 2000, pp. 124-139.

Fenner, W., *Internet Group Management Protocol Version 2,* RFC 2236, Nov. 1997, pp. 1-24.

Mogul, J. et al., *"Internet Standard Subnetting Procedure",* RFC 950, Aug. 1985, pp. 1-18.

Schulzrinne et al., *"RTP: A Transport Protocol for Real-Time Applications",* RFC 1889, pp. 1-75.

Privat, Jermone, *"Double Phase DHCP Configuration",* <draft-privat-dhc-doublephase-01.txt>, Internet Engineering Task Force, Sep. 1999, pp. 1-4.

Borella, Michael et al., *"Realm Specific IP: Protocol Specification",*<draft-ietf-nat-rsip-protocol-02.txt>, Internet Draft, Aug. 1999, pp. 1-27.

Gilligan, R. et al., *"Transition Mechanisms for IPv6 Hosts and Routers",* RFC 1933, Apr. 1996, pp. 1-22.

Afifi, H. et al., *"Method for IPv4-IPv6 Transition"*, Proceedings IEEE International Symposium on Computers and Communications, Jul. 6-8, 1999, pp. 478-484.

RFC2522-"Photuris: Session-Key Management Protocol," P. Karn, Qualcomm; W. Simpson, DayDreamer; The Internet Society, Mar. 1999 (See Explicitly: Section 3-"Cookie Exchange").

RFC2408-"Internet Security Association and Key Management Protocol (ISAKMP)," D. Maughan, National Security Agency; M. Schertler, Securify, Inc.; M. Schneider, National Security Agency; J. Turner, RABA Technologies, Inc.; The Internet Society, Nov. 1998 (See Explicitly: Section 1.7.1 "Anti-Clogging-Denial of Service").

"Random Number Generators," Computational Science Education Project, 1991, 1992, 1993, 1994, 1995.

"10 Random Numbers," Ian Foster, 1995.

* cited by examiner

PROTOCOL STACK

USE OF IKE ANTI-CLOGGING DIGITAL COOKIES

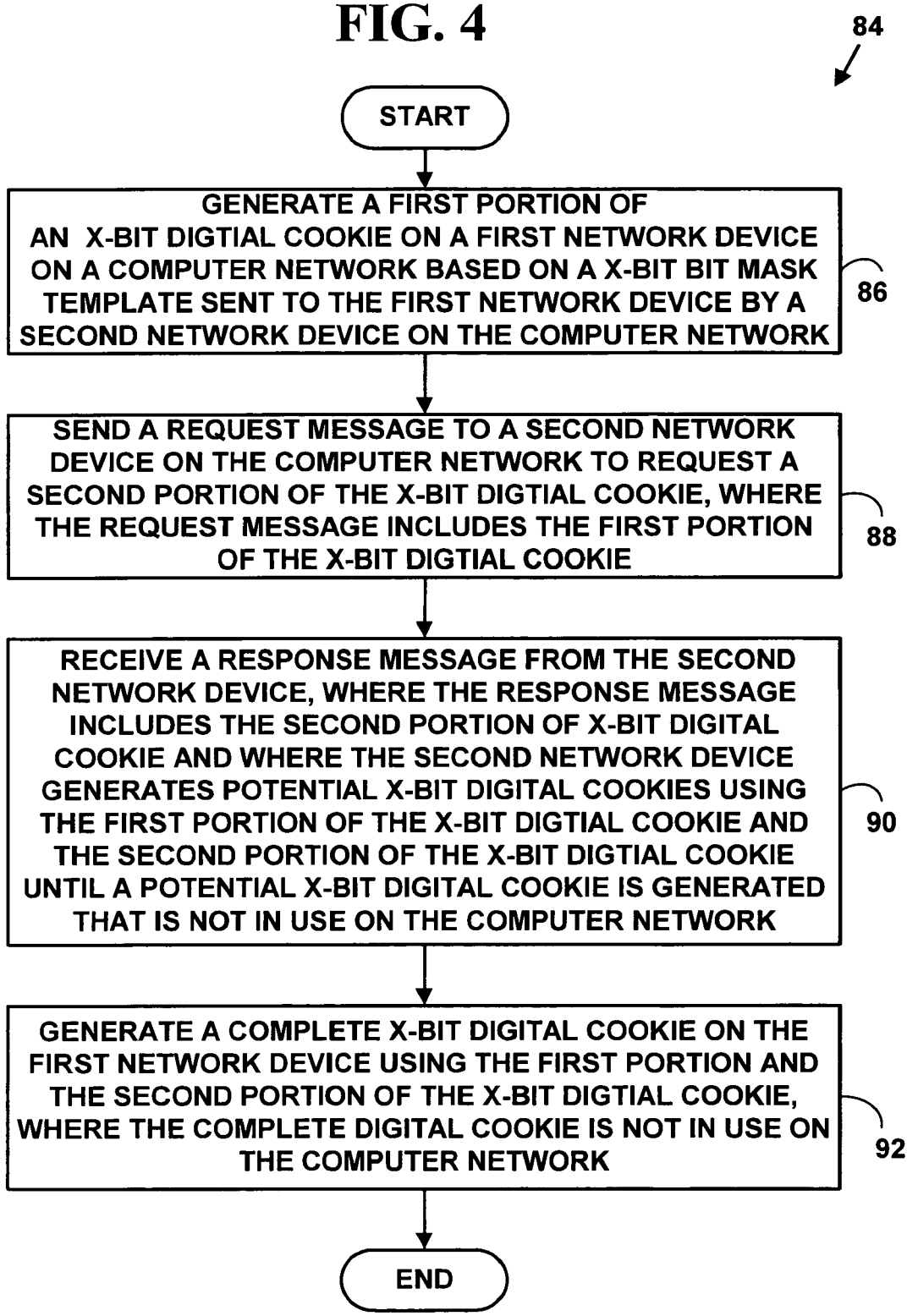

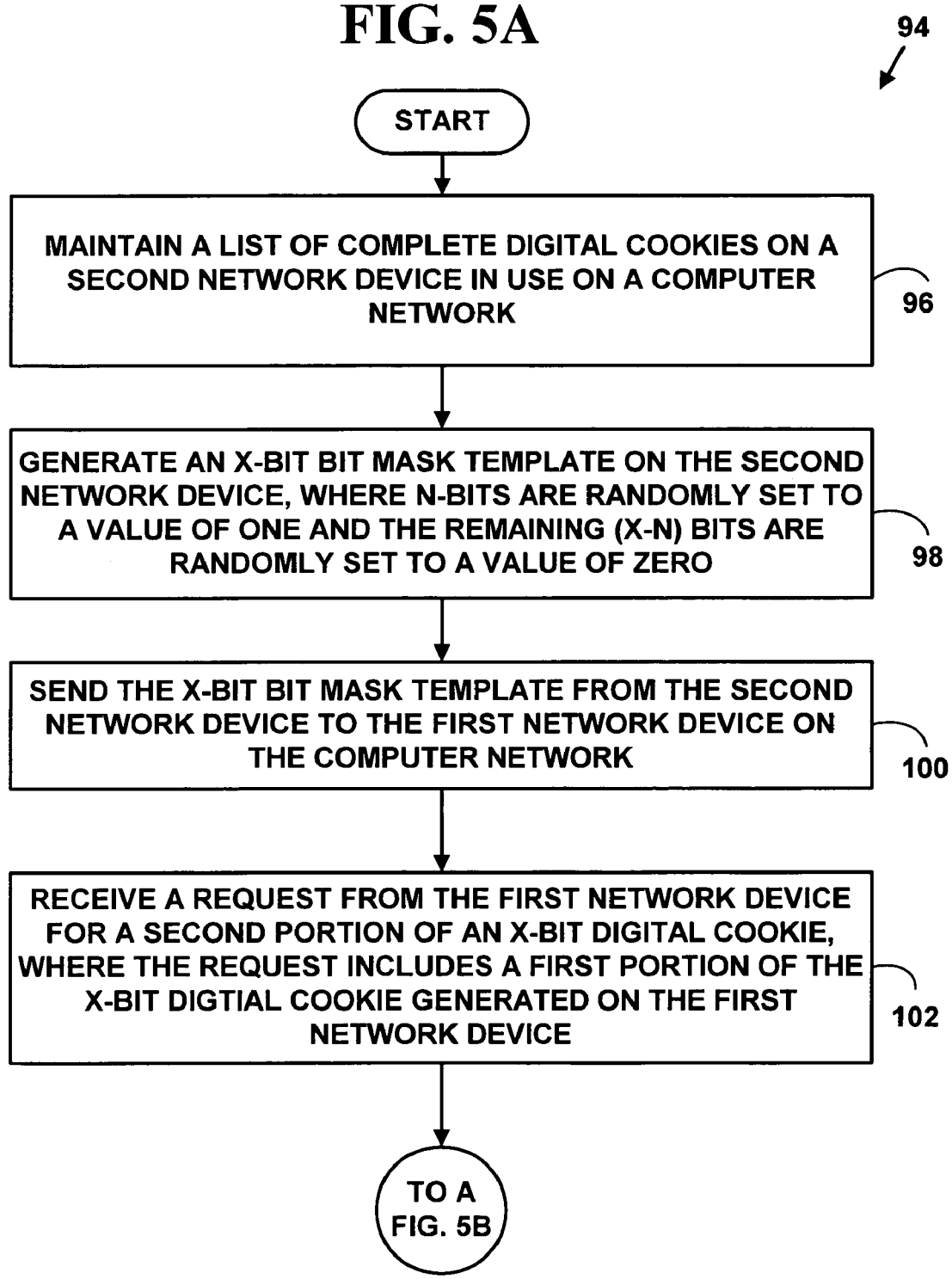

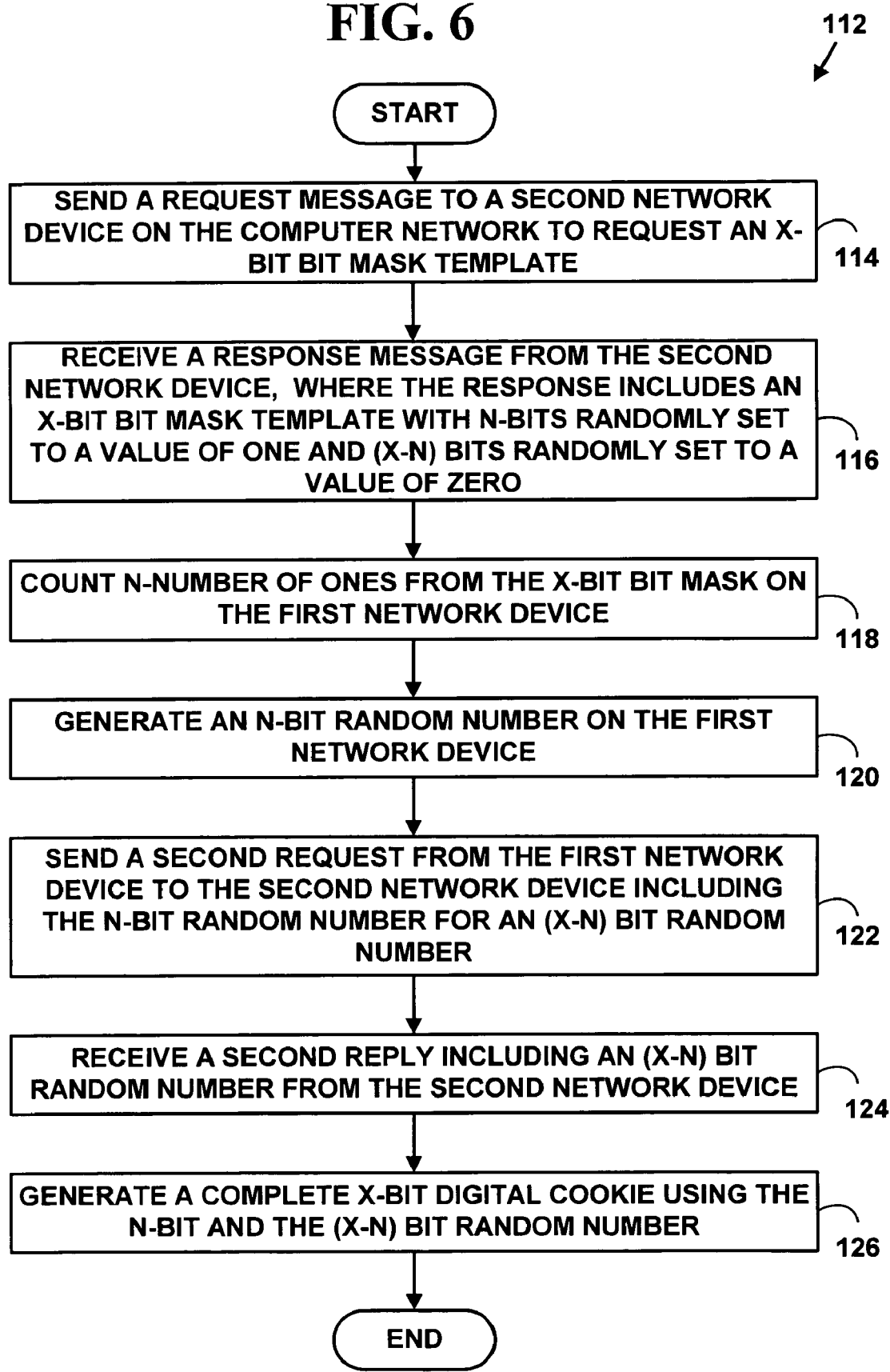

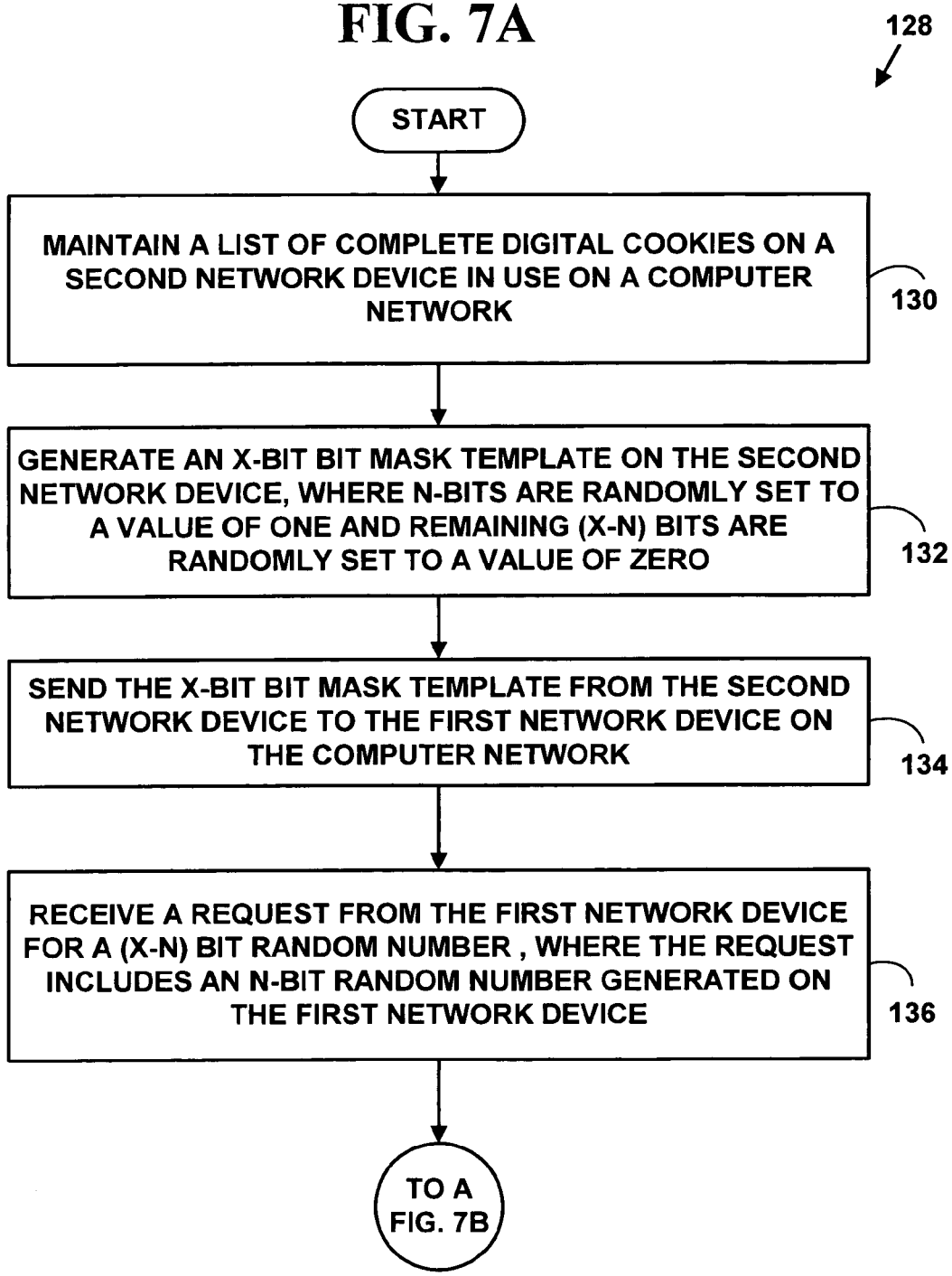

METHOD AND SYSTEM FOR DISTRIBUTED GENERATION OF UNIQUE RANDOM NUMBERS FOR DIGITAL TOKENS

FIELD OF INVENTION

This invention relates to computer networks. More specifically, it relates to a method and system for distributed generation of unique random numbers for digital tokens such as digital cookies.

BACKGROUND OF THE INVENTION

The Internet Protocol ("IP") is an addressing protocol designed to facilitate the routing of traffic within a network or between networks. The Internet Protocol is used on many computer networks including the Internet, intranets and other networks. Current versions of Internet Protocol such as Internet Protocol version-4 ("IPv4") are becoming obsolete because of limited address space. With a 32-bit address-field, it is possible to assign $2^{32}$ different addresses, which is 4,294,967,296, or greater than about 4 billion globally unique addresses.

However, with the explosive growth of the Internet and intranets, Internet Protocol addresses using a 32-bit address-field may soon be exhausted. Internet Protocol version-6 ("IPv6") proposes the use of a 128-bit address-field for Internet Protocol addresses. However, a large number of legacy networks including a large number of Internet subnets, will still be using older versions for Internet Protocol with a 32-bit address space for many years to come. As is known in the art, a subnet is smaller of part of a larger network using a similar network addressing scheme.

Network Address Translation ("NAT") has been proposed to extend the lifetime of Internet Protocol version 4 by allowing subnets with private Internet Protocol addresses to exist behind a single or small number of globally unique Internet Protocol addresses (see e.g., Internet Engineering Task Force ("IETF") RFC-2663, "IP Network Address Translator ("NAT") Terminology and Considerations," by P. Srisuresh and M. Holdrege, August 1999). Each private host uses a single global Internet Protocol address for communication with external networks such as the Internet.

Internally, a subnet may use local private addressing. Local private addressing may be any addressing scheme that is different from the public Internet Protocol addressing. The local addresses on a subnet are typically not available to the external, global Internet. When a device or node using local addressing desires to communicate with the external world, its local address is translated to a common external Internet Protocol address used for communication with an external network by a network address translation device. That is, network address translation allows one or more global Internet Protocol addresses to be shared among a larger number of network devices using local private addresses.

There are several problems associated with using network address translation to extend the life of the Internet Protocol version-4. Network address translation interferes with the end-to-end routing principal of the Internet that recommends that packets flow end-to-end between network devices without changing the contents of any packet along a transmission route (see e.g., "Routing in the Internet," by C. Huitema, Prentice Hall, 1995, ISBN 0-131-321-927).

Current versions of network address translation replace a local network address in a data packet header with an external global network address on outbound traffic, and replace an external global network address in a data packet header with a local private network address on inbound traffic. This type of address translation is computationally expensive, causes security problems by preventing certain types of encryption from being used, or breaks a number of existing applications in a network that cannot coexist with network address translation (e.g., File Transfer Protocol ("FTP")).

Current versions of network address translation may not gracefully scale beyond a small subnet containing a few dozen nodes or devices because of the computational and other resources required. Network address translation potentially requires support for many different application layer internal network protocols be specifically programmed into a translation mechanism such as a network address translation router.

Computational burdens placed on a network address translation router may be significant and degrade network performance, especially if several network address translation-enabled sub-networks share the same network address translation router. In a worst case scenario, a network address translation router translates every inbound and data packet.

Some of the problems associated with network address translation of private network addresses into public network addresses have been overcome with Distributed Network Address Translation ("DNAT") and "Realm Specific Internet Protocol" ("RSIP") as is explained below.

The Internet Protocol is used on global computer networks such as the Internet, and on many private networks such as intranets and Virtual Private Networks. It is often desirable to protect information sent with the Internet Protocol using different types of security. Using security with the Internet Protocol allows private or sensitive information to be sent over a public network with some degree of confidence that the private or sensitive information will not be intercepted, examined or altered.

Internet Protocol security ("IPsec") is a protocol for implementing security for communications on networks using the Internet Protocol through the use of cryptographic key management procedures and protocols. Communications between two endpoints of an Internet Protocol traffic flow are made end-to-end-secure by the Internet Protocol security protocol on an individual Internet Protocol packet-by-packet basis. Internet Protocol security protocol entities at connection endpoints have access to, and participate in, critical and sensitive operations that make a common connection secure.

The Internet Key Exchange ("IKE") protocol establishes a secure Internet Protocol security channel between two network devices. In order to avoid "denial-of-service" attacks, Internet Key Exchange enabled network devices that perform Diffie and Hellman exponentiation, use anti-clogging digital "tokens" or "cookies". As is known in the art, a digital "cookie" or a digital token is a block of data used to identify a network device or a user of a network device. As is known in the art, Diffie and Hellman (hereinafter Diffie-Hellman) describe a means for two parties to agree upon a shared secret in such a way that the secret will be unavailable to eavesdroppers.

As is known in the art, a "denial-of-service attack" includes flooding a network device with a large number of bogus data packets (e.g., flooding a network device with bogus data packets including bogus Internet Protocol source addresses). Absolute protection against denial of service is virtually impossible, but anti-clogging digital cookies provide a technique for reducing the impact of denial-of-service attacks.

Anti-clogging digital cookies are used in Internet Key Exchange protocol exchanges between an initiator and a responder. The details of anti-clogging digital cookie generation are implementation dependant, but should satisfy the three basic requirements of digital cookie generation stated by Phil Karn as is presented in "Internet Security Association and Key Management Protocol ("ISAKMP")," by D. Maughan, M. Schertler, M. Schneider and J. Turner, IETF RFC-2408, November, 1998. See also P. Karn and W. Simpson in "Photuris: Session Key Management Protocol," IETF RFC-2522, March 1999.

These three basic requirements of digital cookie generation include: (1) The digital cookie must depend on the specific parties using the digital cookie. This prevents an attacker from obtaining a digital cookie using a real Internet Protocol address and User Datagram Protocol ("UDP") port, and then using it to swamp the victim with Diffie-Hellman requests from randomly chosen Internet Protocol addresses or User Datagram Ports; (2) It must not be possible for anyone other than an issuing entity to generate digital cookies that will be accepted by that entity. This implies that the issuing entity must use local secret information in the generation and subsequent verification of a digital cookie. It must not be possible to deduce this secret information from any particular digital cookie; and (3) The digital cookie generation function must be fast enough to thwart attacks intended to sabotage Central Processing Unit resources.

In subnets that utilize an Internet Protocol address sharing scheme such as Distributed Network Address Translation or Realm Specific Internet Protocol, a digital cookie is used by a Distributed Network Address Translation/Realm Specific Internet Protocol gateway to route responses. If Internet Key Exchange protocol is used (e.g., source port 500), all digital cookies must be unique to allow for routing to an appropriate network device. Thus, all initiator digital cookies in use on a given DNAT/RSIP subnet must be unique.

There are a number of methods used to create anti-clogging digital cookies. For example, an initiator randomly chooses a digital cookie and transmits the digital cookie in a first Internet Key Exchange protocol message. A gateway to a subnet examines the digital cookie, and if it matches any other digital cookie in use, the gateway either: (a) drops the message; or (b) sends an error message back to the initiator. The problem with this method is that the multiple messages add latency to the Internet Key Exchange protocol transactions, or require modifications to the Internet Key Exchange protocol.

Another method to create an anti-clogging digital cookie includes allowing a gateway to allocate contiguous blocks of digital cookies to each initiator. A initiator can randomly choose digital cookies within the space of their given block of digital cookies. The problem is that this method reduces the entropy of the digital cookies on a per client basis from x-bits (e.g., 64 bits for Internet Protocol Exchange digital cookies) to something less than x-bits, and therefore violates digital cookie generation requirement (2) stated above.

A number of distributed and parallel random number generation methods have been proposed that may be used generate digital cookies or digital tokens. However, many of these methods rely on parallelizing random generation using multiple parallel processsors. See for example, U.S. Pat. No. 5,793,657, "Random number generating apparatus and random number generating method in a multiprocessor system," U.S. Pat. No. 5,327,365, "Generating system of random-number sequences for a parallel computer system," at the Universal Resource Location ("URL"), http://www-unix.mcs.anl.gov/dbpp/text/node116.html Section 10, "Designing and Building Parallel Programs," by Ian Foster, 1995, at the URL, http://csep1.phy.ornl.gov/rn/node19.html#SECTION00060000000000000000, Section on random number generation, "Vectorization and Access via Multiple Processors: LCGs," Computational Science Education Project, Sponsored by U.S. Department of Energy, September, 1995.

However, these methods rely on the mathematical properties of the actual parallelized random number generators in use. These methods can not typically be generally deployed on a computer network without specialized parallel processing equipment. These methods may also not produce a unique random number, which is typically required for digital cookie used for security purposes.

Thus, it is desirable to have a digital cookie generation method allows all x-bits of a digital cookie to be generated in a pseudo-random, but non-predictable fashion. The digital cookies should be generated in a manner such that no two digital cookies used by initiators are exactly the same and no two identical digital cookies are in use at the same time on a computer network.

SUMMARY OF THE INVENTION

In accordance with preferred embodiments of the present invention, some of the problems associated with generating digital cookies or digital tokens are overcome. A method and system for distributed generation of unique random numbers for creating digital cookies is provided.

One aspect of the invention includes a method for distributed generation of unique random numbers for digital cookies from a client network device. A first network device (e.g., a computer) on a computer network receives an x-bit bit mask template from a second network device on the computer network (e.g., a gateway). The x-bit bit mask template is used as a framework for a complete x-bit digital cookie. The first network device generates a first portion potential x-bit digital cookie. The first network device requests a second portion of the potential x-bit digital cookie from the second network device. The request includes the first portion of potential x-bit digital cookie. The first network device generates a complete x-bit digital cookie using the first portion the potential x-bit-digital cookie generated by the first network device and the second portion of the potential x-bit digital cookie generated by the second network device. The first and second portions of the potential x-bit digital cookie are based upon random numbers generated by the first and second network devices respectively.

The newly generated complete x-bit digital cookie is not in use on the computer network. The second network device has selected the second portion of the potential x-bit digital cookie so that the complete x-bit digital cookie including the first portion network device is not use on the computer network. The complete x-bit digital cookie is unique on the computer network since the second network device manages the x-bit digital cookies in use on the computer network.

Another aspect of the invention includes methods for distributed generation of unique random numbers for digital cookies from a server network device. A second network device on a computer network maintains a list of complete digital cookies in use on a computer network. The second network device generates an x-bit bit mask template to be used as a framework for a complete x-bit digital cookie. The x-bit bit mask template is sent to a first network device on the computer network. The second network device receives a request for a second portion of an x-bit digital cookie. The request includes a first portion of the x-bit digital cookie generated on the first network device using the x-bit bit mask. The first and second portions of the x-bit digital cookie are based upon unique random numbers generated by the first and second network devices respectively.

The second network device selects the second portion of the x-bit digital cookie by generating one or more potential x-bit digital cookies using the first portion generated by the first network device and second portions of a digital cookie generated by the second network device. The generated potential x-bit digital cookies are compared with a list of complete x-bit digital cookies in use on the computer network. When a potential x-bit digital cookie that is not in use on the computer network is discovered, the second portion of the x-bit digital cookie used to create the potential x-bit digital cookie is returned to the first network device. The first network device can then create a complete x-bit digital cookie that is not in use on the computer network, since the second network device manages all of the x-bit digital cookies in use on the computer network.

For example, the methods and system described herein may be used on a Distributed Network Address Translation or Realm Specific Internet Protocol subnet to allow a network device (e.g., a computer) to create a complete x-bit digital cookie with help form a Distributed Network Address Translation/Realm Specific Internet Protocol gateway. The complete x-bit digital cookie can be used as a 64-bit anti-clogging cookie for Internet Key Exchange protocol exchanges. However, the present invention is not limited to these exemplary embodiments, and the methods and system described herein can be used as a general scheme for distributed generation of unique random numbers for digital cookies and other applications.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein:

FIG. 4 is a flow diagram illustrating a method for distributed generation of unique x-bit digital cookies from a client network device;

FIGS. 5A and 5B are a flow diagram illustrating a method for distributed generation of unique x-bit digital cookies from a server network device;

FIG. 6 is a flow diagram illustrating a method for distributed generation of unique random numbers for digital cookies from a client network device; and FIGS. 7A and 7B are a flow diagram illustrating a method for distributed generation of unique random numbers for digital cookies from a server network device.

DETAILED DESCRIPTION OF PREFERRED EMBODIMENTS

Figure 1:
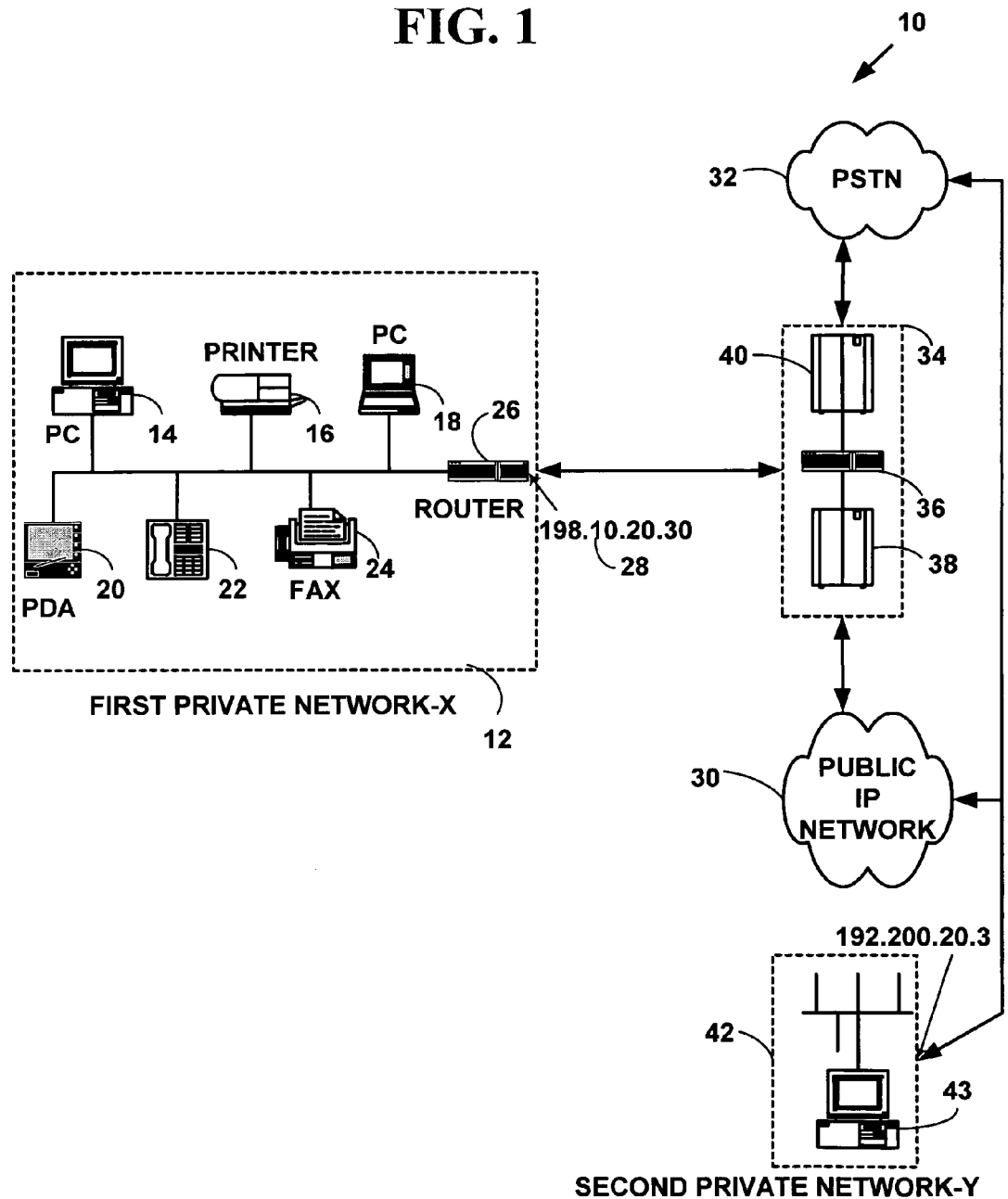
FIG. 1 is a block diagram illustrating an exemplary network system.

Exemplary Network System FIG. 1 is a block diagram illustrating an exemplary network system 10 for one embodiment of the present invention. The network system 10 includes a first private computer network-x 12 with multiple network devices (14, 16, 18, 20, 22, 24) and a router 26 to route data packets to another external computer network. The router 26 may also function as a Distributed Network Address Translation ("DNAT") or Realm Specific Internet Protocol ("RSIP") gateway that includes security features as is explained below. As is known in the art, a "gateway" is a device that connects two networks using different communications protocols so that information can be passed from one to the other. A gateway both transfers information and converts it to a form compatible with the protocols used by a receiving network. The multiple network devices include any of computers (14, 18), printers 16, personal digital assistants 20, telephones 22 or other network devices not illustrated in FIG. 1.

The first computer network-x 12 has an external common network address 28 (e.g., a global Internet Protocol address, 198.10.20.30) to identify the first private computer network-x 12 to an external computer network such as a second computer network 30 and/or a third computer network 32 external to the first private computer network-x 12. The multiple network devices (14, 16, 18, 20, 22, 24 and 26) have a private internal network address (i.e., a private network address) on the first private computer network-x 12 (e.g., 10.0.0.x, etc.). In one embodiment of the present invention, a network access service provider 34 with a router 36 routes data packets to/from the first private computer network-x 12 a public to second public computer network 30 and/or to a third public computer network 32 through a second network switch 38 and/or a third network switch 40. In another embodiment of the present invention, the first private computer network-x 12 is connected directly to the second computer network 30. The first private computer network-x 12 is also connected to a second private computer network-y 42 via public computer networks 30 or 32. The second private computer network-y 42 is also a private computer network that includes multiple network devices, only one of which is illustrated as computer 43, that use private internal network addresses behind a public globally routable network address (e.g., a global Internet Protocol address 192.200.20.3).

In one embodiment of the present invention, the first private computer network-x 12 is a Small Office/Home Office ("SOHO") Local Area Network ("LAN"), also called a "legacy" LAN. The first private computer network 12 can also be a "stub" network or a sub-network ("subnet"). As is known in the art, a "stub" network typically includes multiple network devices using a common external network address to communicate with an external network such as the Internet. As is known in the art, a "subnet" is a smaller part of a larger network that uses a common addressing scheme (e.g., Internet Protocol addresses). The second network 30 is the Internet or an intranet, and the third network 32 is a Public Switched Telephone Network ("PSTN"). The second private-network-y 42 is also a SOHO LAN, stub network or subnet. However, other network types and network components can also be used and the present invention is not limited to the network types and network components described for this embodiment.

Network devices and routers for embodiments of the present invention include network devices that can interact with network system 10 and network system 100 discussed below that are compliant with all or part of standards proposed by the Institute of Electrical and Electronic Engineers ("IEEE"), International Telecommunications Union-Telecommunication Standardization Sector ("ITU"), Internet Engineering Task Force ("IETF"), the Wireless Application Protocol ("WAP") Forum, and Data-Over-Cable-Service-Interface-Specification ("DOCSIS") standards for Multimedia Cable Network Systems ("MCNS"). However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wapforum.org." The DOCSIS standards can be found at the URL "www.cablemodem.com."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

Figure 2:
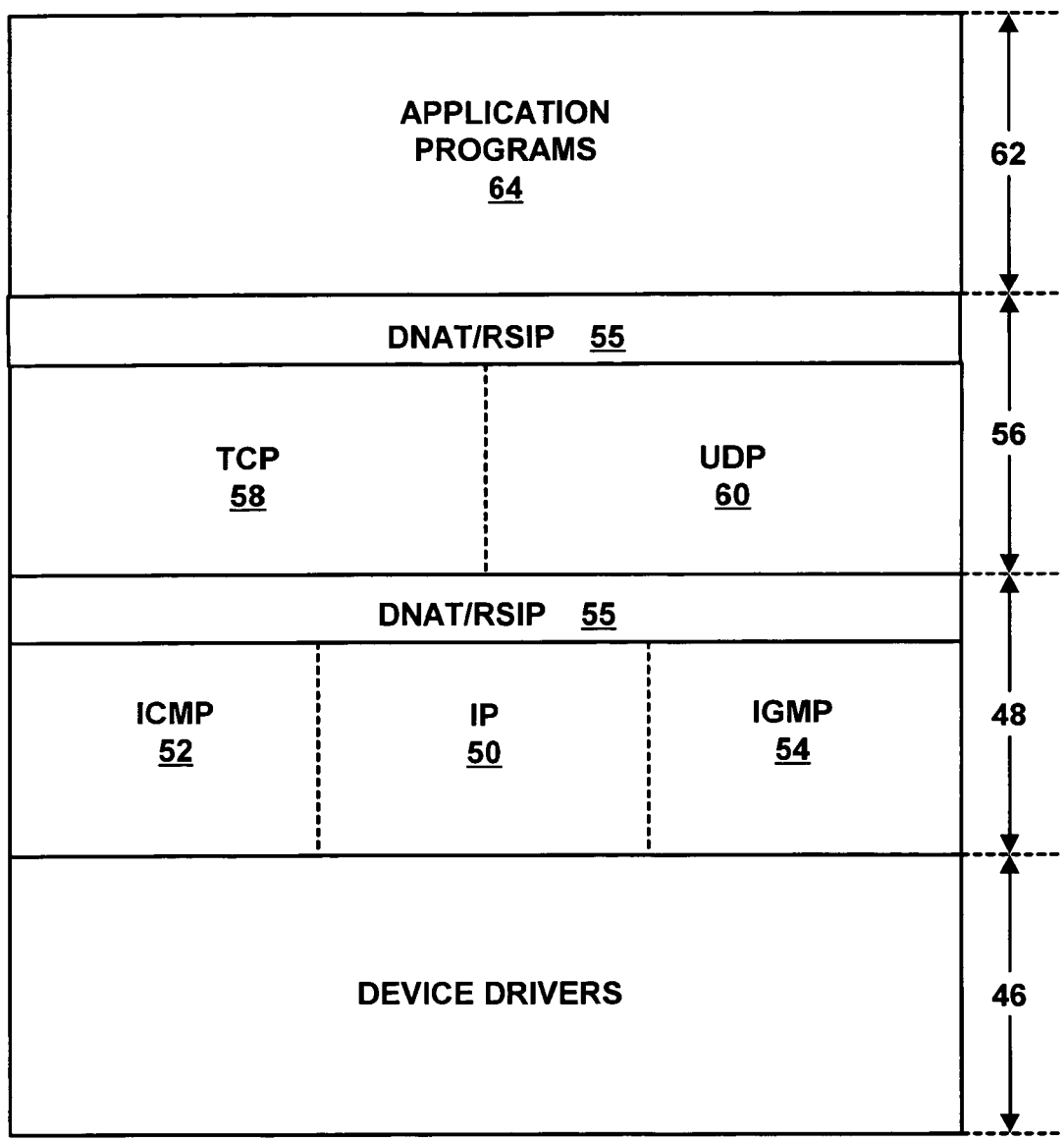
FIG. 2 is a block diagram illustrating a protocol stack for the network devices.

FIG. 2 is a block diagram illustrating an exemplary layered protocol stack 44 for network devices from the exemplary network system 10 (FIG. 1) and network system 100 (FIG. 4). The layered protocol stack 44 is described with respect to Internet Protocol suites comprising from lowest-to-highest, a link, network, transport and application layer. However, more or fewer layers could also be used, and different layer designations could also be used for the layers in the protocol stack 44 (e.g., layering based on the Open Systems Interconnection ("OSI") model).

The network devices (14, 16, 18, 20, 22, and 24) are connected to the first private computer network-x 12 and second private computer network-y 42 with Network Interface Card ("NIC") device drivers in a link layer 46 for the hardware network devices connecting the network devices to the computer network 12. The link layer 44 may include a Medium Access Control ("MAC") protocol layer or other data-link layer protocol.

Above the link layer 48 is a network layer 48 (also called the Internet Layer for Internet Protocol suites). The network layer 48 includes an IP layer 50. As is known in the art, IP 50 is an addressing protocol designed to route traffic within a network or between networks. IP layer 50, hereinafter IP 50, is described in IETF RFC-791, incorporated herein by reference. The network layer 48 also includes an Internet Group Management Protocol ("IGMP") layer 52, an Internet Control Message Protocol ("ICMP") layer 54.

ICMP layer 52, hereinafter ICMP 52, is used for Internet Protocol control. The main functions of ICMP 52 include error reporting, reachability testing (e.g., "pinging"), route-change notification, performance, subnet addressing and other maintenance. For more information on ICMP 52 see IETF RFC-792, incorporated herein by reference. IGMP layer 54, hereinafter IGMP 54, is responsible for multicasting. For more information on IGMP 54 see IETF RFC-1112, incorporated herein by reference.

The network layer 48 may also include an optional DNAT/RSIP layer 55. The DNAT/RSIP layer 55 is used to allocate locally unique ports as well as a combination network address including a locally unique port and a common external network address (e.g., an IP address) for a Distributed Network Address Translation server for communications with the external networks. For more information on the DNAT protocol, and the DNAT see co-pending U.S. application Ser. No. 09/035,600, incorporated herein by reference. DNAT is also called "Realm Specific Internet Protocol" ("RSIP") by the IETF. For more information on RSIP see, "Realm Specific IP Framework," by M. Borella and J. Lo, IETF draft, <draft-ieft-nat-rsip-framework-03.txt>, December 1999, and "Realm Specific IP: Protocol Specification," by M. Borella and J. Lo, IETF draft, <draft-ietf-nat-rsip-protocol-05.txt>, January 2000, both incorporated herein by reference.

Above network layer 48 is a transport layer 56. The transport layer 56 includes a Transmission Control Protocol ("TCP") layer 58 and a User Datagram Protocol ("UDP") layer 60, and may also include an optional DNAT/RSIP layer 55 described above.

The TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58 see IETF RFC-793, incorporated herein by reference.

The UDP layer 60, hereinafter UDP 60, provides a connectionless mode of communications with datagrams in an interconnected set of computer networks. UDP 60 provides a transaction oriented datagram protocol, where delivery and duplicate packet protection are not guaranteed. For more information on UDP 60 see IETF RFC-768, incorporated herein by reference. Both TCP 58 and UDP 60 are not required in protocol stack 42. Either TCP 58 or UDP 60 can be used without the other.

Above the transport layer 56 is an application layer 62 including application programs 64. The application programs 64 provide desired functionality to a network device (e.g., telephony or other communications functionality).

Internet Protocol Security

There are a number of security measures that can be used with IP 50. One or more security measures can be indicated in an IP 50 header. Internet Protocol security ("IPsec") processing is confined completely within the IP 50 layer. All DNAT/RSIP processing, when used with Internet Protocol security must run above the IP 50 layer. Otherwise, Internet Protocol security parameters are violated. IPsec is used with DNAT as is described in co-pending application Ser. Nos. 09/270,967 and 09/271,025, incorporated herein by reference. IPsec is used with RSIP as is described in "RSIP Support for End-to-End IPsec," by G. Montegero and M. Borella, IETF-draft <draft-ietf-nat-rsip-ipsec-02.txt>, January 2000, incorporated herein by reference.

IPsec provides security for IP 50 packets. For more information in IPsec see "Security Architecture for the Internet Protocol", by S. Kent and R. Atkinson, IETF RFC-2401, November, 1998, incorporated herein by reference.

Internet Key Exchange ("IKE") Protocol

As was discussed above, IKE is a security protocol that carries a security certificate. For more information on IKE see, "The Internet Key Exchange (IKE)," by D. Harkins and D. Carrel, IETF RFC-2409, November, 1998, incorporated herein by reference. In one embodiment of the present invention, the IKE security certificate is an Internet X.509 certificate. For more information on Internet X.509 security certificates, see IETF RFC-2459, "Internet X.509 Public Key Infrastructure Certificate and CRL Profile," by R. Housley, W. Ford, W. Polk and D. Solo, incorporated herein by reference.

IKE can be used to establish a secure connection between a first endpoint a second endpoint. A digital anti-clogging "cookie" or Anti-Clogging Token ("ACT") is used to help protect a network device from attack without spending excessive CPU resources to determine if a digital cookie is authentic. As is known in the art, a digital "cookie" is a block of data used to identify a network device or a user of a network device.

As is known in the art, a "denial-of-service attack" includes flooding a network device with a large number of bogus data packets (e.g., flooding a network device with data packet with bogus IP 50 source addresses). Absolute protection against denial of service is virtually impossible, but anti-clogging digital cookies provide a technique for reducing denial-of-service attacks. The use of an anti-clogging digital cookie for reducing denial-of-service attacks was introduced by P. Karn and W. Simpson in "Photuris: Session Key Management Protocol," IETF RFC-2522, incorporated herein by reference.

Anti-clogging digital cookies are implementation dependent, but should always satisfy the three basic requirements originally stated by P. Karn as presented in RFC-2408 as illustrated in Table 1.

TABLE 1

1. The digital cookie must depend on the specific parties. This prevents an attacker from obtaining a digital cookie using a real IP 50 address and UDP 60 port, and then using it to swamp the victim with Diffie-Hellman requests from randomly chosen IP 50 addresses or UDP ports 60.
2. It must not be possible for anyone other than the issuing entity to generate digital cookies that will be accepted by that entity. This implies that the issuing entity must use local secret information in the generation and subsequent verification of a digital cookie. It must not be possible to deduce this secret information from any particular digital cookie.
3. The digital cookie generation function must be fast to thwart attacks intended to sabotage CPU resources.

As is known in the art, Diffie-Hellman describe a means for two parties to agree upon a shared secret in such a way that the secret will be unavailable to eavesdroppers. For more information, see W. Diffie and M. Hellman, "New Directions in Cryptography", IEEE Transactions on Information Theory, pp. 644–654, November 1976, incorporated herein by reference. Anti-clogging digital cookies are used in IKE exchanges between an initiator and a responder.

Figure 3:
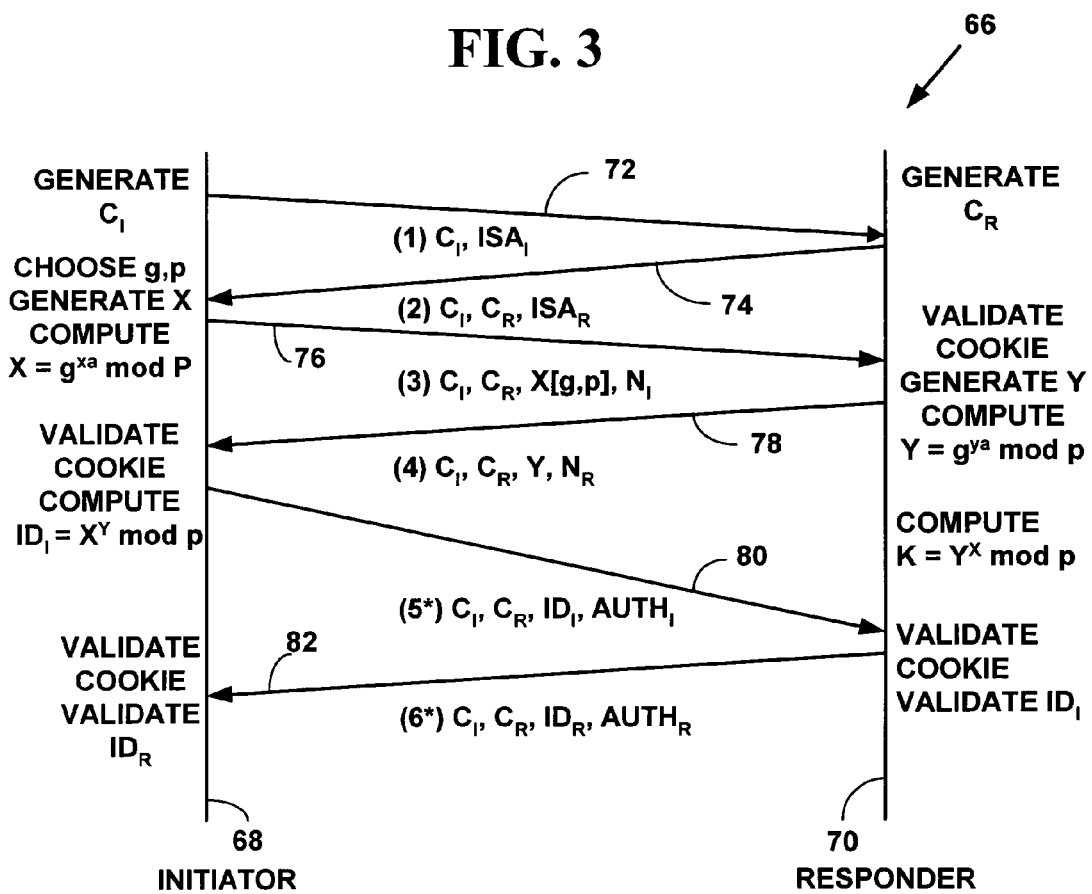
FIG. 3 is a block diagram illustrating use of an Internet Key Exchange anti-clog cookie.

FIG. 3 is a block diagram 66 illustrating use of an IKE anti-clogging digital cookie. An initiator 68 sends generates an anti-clogging digital cookie $C_I$, and sends the digital cookie with an initiator IKE SA indicator $ISA_I$ to a responder 70 in a first IKE message 72. The responder 70 generates an anti-clogging digital cookie $C_R$ and sends the initiator anti-clogging digital cookie $C_I$ and the responder anti-clogging digital cookie $C_R$ and a responder IKE Security Association ("SA") indicator $ISA_R$ in a second IKE message 74. The initiator 68, using Diffie-Hellman, chooses g and p, where p is a large prime number and is any number two or greater. The initiator 68 generates a private encryption key-xa and computes a public encryption key, $X=g^{xa}$ mod p. The initiator 68 sends the initiator anti-clogging digital cookie $C_I$, the responder anti-clogging digital cookie $C_R$, the public encryption key X, and $N_I$, a "nonce" payload in a third IKE message 76. As is known in the art, a nonce payload includes random data used to guarantee payload "liveliness" during a key exchange and protect against replay attacks.

The responder 70 validates the anti-clogging digital cookies, generates a private encryption key-ya and computes a public encryption key, $Y=g^{ya}$ mod p. The responder 70 sends the initiator anti-clogging digital cookie $C_I$, the responder anti-clogging digital cookie $C_R$, the public encryption key Y, and a nonce payload $N_R$ in a fourth IKE message 78. The initiator 68 validates the anti-clogging digital cookies and computes an identification payload $ID_I$ as $=X^y$ mod p using the public encryption key-Y from the responder 70. Optional fifth and sixth messages may be used to further validate the IKE connection.

The initiator 68 sends the initiator anti-clogging digital cookie $C_I$, the responder anti-clogging digital cookie $C_R$, the identification payload identifier $ID_I$ and an authorization payload $AUTH_I$ in a fifth IKE message 80. The authorization payload includes a secure digital signature or a secure hash value (e.g., generated with Message Digest-5 ("MD5") or a Secure Hash ("SH") standard) as part of a security certificate (e.g., X.509) as was described above. For more information on MD5 see "The MD5 Message Digest Algorithm," by R. Rivest, IETF RFC-1321, April 1992, incorporated by reference. For more information on the Secure Hash standard see, "Secure Hash Standard", FIPS 180–1, National Institute of Standards and Technology, U.S. Department of Commerce, May 1994.

The responder 70 validates the anti-clogging digital cookies. The responder 70 validates the identification payload identifier $ID_I$ using its private encryption key-ya. The responder 70 sends the initiator anti-clogging digital cookie $C_I$, the responder anti-clogging digital cookie $C_R$, an identification payload identifier $ID_R$ and an authorization payload $AUTH_R$ in a sixth IKE message 82. The initiator 68 validates the anti-clogging digital cookies. The initiator 68 validates the identification payload identifier $ID_R$ using its private encryption key-xa.

Requesting Distributed Generation of Unique Digital Cookies from a Client Network Device IKE is just one example of a protocol that generates and uses digital cookies. However, other protocols and applications also use digital cookies. An ideal anti-clogging digital cookie method should allow n-bits of the digital cookie to be generated in a pseudo-random, but non-predictable fashion such that no two initiator digital cookies with the same value can be in use at the same time in the same network. Within subnets that utilize an IP 50 address sharing scheme, such as DNAT/RSIP, an initiator digital cookie $C_1$ is used by a DNAT/RSIP gateway 26 to route responses. Thus, all initiator digital cookies in use by initiators on a given DNAT/RSIP subnet must be unique.

A DNAT/RSIP gateway 26 maintains a list of all digital cookies in use so that digital cookie uniqueness is maintained. Since it is undesirable for the DNAT/RSIP gateway to generate all n-bits of a digital cookie on any one device such as DNAT/RSIP gateway 26, the digital cookie generation is split between the DNAT/RSIP gateway 26 and the initiator 68.

FIG. 4 is a flow diagram illustrating a Method 84 for distributed generation of unique digital cookies from a client network device. At Step 86, a first portion of an x-bit digital cookie is generated on a first network device on the computer network based on a x-bit bit mask template sent to the first network device from a second network device on the computer network. The x-bit bit template mask is used as a framework to create a complete x-bit digital cookie. At Step 88, a first message is sent to request a second portion of the x-bit digital cookie from the second network device, wherein the first message includes the first portion of the x-bit digital cookie. At Step 90, a first response is received from the second network device. The first response includes the second portion of the x-bit digital cookie from the second network device. The second network device generates potential x-bit digital cookies using the first portion of the x-bit digital cookie from the first network device and a second portion of the x-bit digital cookie generated on the second network device until the second network device generates a potential x-bit digital cookie that is not in use on the computer network. At Step 92, a complete x-bit digital cookie is generated on the first network device using the first portion of the x-bit digital cookie and the second portion of the x-bit digital cookie. The complete x-bit digital cookie is not in use on the computer network. The complete x-bit digital cookie is unique on the computer network since the second network device manages the x-bit digital cookies in use on the computer network.

The first network device can use the complete x-bit digital cookie in one or more messages (e.g., IKE messages) to establish a secure connection between the first network device on the computer network and third network device on a remote computer network. The second network device maintains a list of all complete x-bit digital cookies created and in use, and ensures no duplication on the second network device when it returns the second portion of the x-bit digital cookie. The first network device thus, can generate a complete x-bit digital cookie that is not in use on the computer network.

The first response received at Step 90 can also be a failure response to indicate that the second network device cannot return a valid second portion of the x-bit digital cookie using the first portion of the x-bit digital cookie sent by the first network to the second network device. In such a scenario, the first network device generates a new first portion of the x-bit digital cookie at Step 86, and repeats the remaining steps of Method 84 until a second portion of the x-bit digital cookie can be generated by the second network device. Thus, the second network device will eventually send an appropriate second portion of the x-bit digital cookie so the first network device can generate a complete x-bit digital cookie that is not in use on the computer network. The second network device will send an appropriate second portion of the x-bit digital cookie back to the first network device for every instance except the one very unlikely instance in which every possible x-bit digital cookie that can be generated is already in use on the computer network. In this very unlikely instance, a failure response is returned to the first network device instead of a second portion of an x-bit digital cookie.

In one exemplary embodiment of the present invention, the complete x-bit digital cookie is used as an anti-clogging cookie in an IKE exchange (e.g., FIG. 3). However, the present invention is not limited to using the complete x-bit digital cookie with IKE messages and can be used as a general method for distributed generation of unique random numbers. Such a general method can be used for creating digital cookies and a number of other applications that need to generate unique values in a distributed manner for use on a computer network.

In one exemplary embodiment of the present invention, the first network device is the initiator 68 and the second network device is DNAT/RSIP gateway 26 or other gateway. However, the present invention is not limited to these network devices and other types of network devices, or equivalent network devices can also be used.

In one exemplary embodiment of the present invention, Step 86 includes generating a n-bit random number. The number-n is determined by counting n-number of bits set to a value of one in the x-bit bit mask sent to the first network device by the second network device, where n is less than or equal to x. However, the present invention is not limited to creating the first portion of the x-bit digital cookie with this method and other methods can also be used (e.g. counting bits set to a value of zero, or other bit patterns).

In one exemplary embodiment of the present invention, Step 92 includes generating a complete x-bit digital cookie on the first network device by placing values of bits from the first portion of the x-bit digital cookie in bit positions with a value of one in the x-bit bit mask, and by placing values of bits from the second portion of the bit mask in bit positions with a value of zero in the x-bit bit mask. However, the present invention is not limited to creating the complete x-bit digital cookie with this method and other methods can also be used.

Distributed Generation of Unique Digital Cookies from a Server Network Device

Method 84 (FIG. 4) illustrates a method for distributed generation of unique digital cookies from a client network device. FIG. 5 illustrates a method for distributed generation of unique digital cookies from a server network device.

Figure 5B:
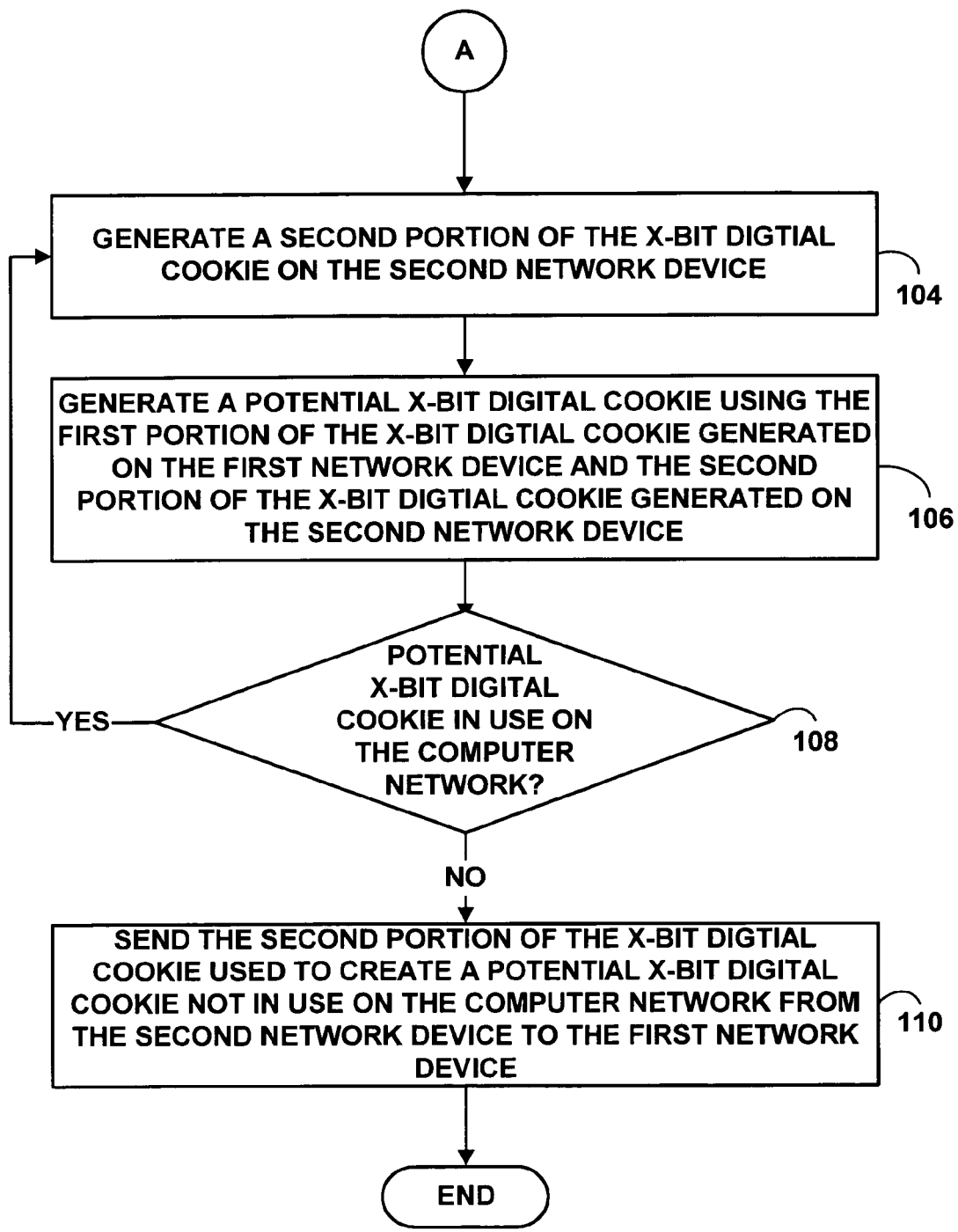

FIGS. 5A and 5B are a flow diagram illustrating a Method 94 for distributed generation of unique digital cookies from a server network device. In FIG. 5A, at Step 96, a list of complete digital cookies in use on the computer network is maintained on a second network device. At Step 98, a x-bit bit mask template is generated on a second network device. The x-bit bit mask has n-bits randomly set to a value of one and remaining (x-n) bits randomly set to value of zero, where n is less than or equal to x. At Step 100, the x-bit bit mask template is sent to a first network device on the computer network. At Step 102, a request is received from the first network device to request a second portion of a x-bit digital cookie, from the second network device, wherein the first message includes a first portion of the x-bit digital cookie.

In FIG. 5B, a loop is entered to repeat steps 104, 106, 108 until a potential x-bit digital cookie is generated that is not in use on the computer network. At Step 104, a second portion of the x-bit digital cookie is generated on the second network device. At Step 106, a potential x-bit digital cookie is generated on the second network device using the first portion of the x-bit digital cookie generated on the first network device and the second portion of the x-bit digital cookie mask generated on the second network device. At Step 108, the potential x-bit digital cookie is compared with complete x-bit digital cookies from the list of complete digital cookies maintained on the first network device that are in use on the computer network.

At 110, the second portion of the x-bit digital cookie for the potential x-bit digital cookie that is not in use on the computer network is sent to the first network device. The first network device uses the first portion of the x-bit digital cookie and the second portion of the x-bit digital cookie to create a complete x-bit digital cookie that is not in use on the computer network. The second network device may have created a large number of potential x-bit digital cookies. When the second network device returns the second portion of the x-bit digital cookie, the first network device is assured that it can generate a complete x-bit digital cookie that is not in use on the computer network. The second network device will send an appropriate second portion of a potential x-bit digital cookie back to the first network device except when a complete x-bit digital cookie cannot be generated using the first portion of the x-bit digital cookie from the first network device.

If the second network device cannot generate a potential x-bit digital cookie using the first portion of the x-bit digital cookie received from the first network device, the second network device sends a failure response to the first network device. Upon receiving the failure response, the first network device generates a new first portion of the x-bit digital cookie and Method 112 is repeated. Multiple iterations of sending the failure response and executing Method 112 allow the second network device to eventually generate a potential x-bit digital cookie that is not in use on the computer network with one exception.

There is one very unlikely instance in which every possible x-bit digital cookie that can be possibly be generated with first portions of the x-bit digital cookie from the first network device are already in use on the computer network. In this very unlikely instance, a new x-bit digital cookie can not be used on the computer network until use of the one or more other x-bit digital cookies on the computer network is terminated.

The second network device can create an x-bit mask with between zero and x-bits (inclusive) set. When zero bits are set, the second network device determines the entire digital cookie, and when x-bits are set, the first network device determines the entire digital cookie. However, as was explained above, it is undesirable for any one device to determine an entire digital cookie if it is used for security applications. Thus, a preferred embodiment of the present invention used for security applications includes generating a first portion of an x-bit digital cookie on a client network device and a second portion of the x-bit digital cookie on the second network device instead of generating a complete x-bit digital cookie on a single network device.

In one exemplary embodiment of the present invention, 64-bits are used for the x-bit bit mask and the complete x-bit digital cookie to provide IKE anti-clogging cookies. The first network device is initiator 68 and the second network device is a DNAT/RSIP gateway 26. However, the present invention is not limited to such an embodiment and other size bit masks and digital cookies and network devices can also be used.

In one exemplary embodiment of the present invention, the first portion of the x-bit digital cookie includes an n-bit random number where n is less than or equal to x. The n-bits are determined by counting a number of bits randomly set to the value of one in the x-bit bit mask sent to the first network device and generating an n-bit random number on the first network device. However, the present invention is not limited to a first portion of the x-bit digital cookie generated with this method and other methods can also be used.

In one exemplary embodiment of the present invention, Step 104 includes generating a (x-n) bit random number on the second network device, where the first portion of the x-bit digital cookie mask from the first network device includes n-bits where n is less than or equal to x. However, the present invention is not limited to generating the second portion of the x-bit digital cookie with this method and other methods can also be used.

Any well-known and trusted random number generator can be used by the first network device and second network device to generate portions of the x-bit digital cookie. For example, virtually any linear-congruential pseudo-random number generator known in the art can be used to generate the first and second portions of the x-bit digital cookie.

In one exemplary embodiment of the present invention, Step 108 includes placing values of bits from a n-bit first portion of the x-bit digital cookie generated on the first network device in bit positions with a value of one in the x-bit bit mask, and placing values of bits from a (x-n) bit second portion of the x-bit digital cookies generated on the second network device in bit positions with a value of zero in the x-bit bit mask. However, the present invention is not limited to generating potential x-bit digital cookies with this method and other methods can also be used.

Distributed Generation of Unique Random Numbers from a Client Network Device

FIG. 6 is a flow diagram illustrating a Method 112 for distributed generation of unique random numbers from a client network device. At Step 114, a first request is sent from a first network device on a computer network to a second network device on the computer network for an x-bit bit mask template. The x-bit bit mask template is used as a framework for a complete x-bit digital cookie. At Step 116, a first response is received on the first network device from the second network device including a x-bit bit mask. The x-bit bit mask has n-bits randomly set to a value of one and (x-n) bits randomly set to zero in an arbitrary pattern, where n is less than or equal to x. At Step 118, n-number of ones in the x-bit bit mask template are counted on the first network device. At Step 120, an n-bit random number is generated on the first network device based on the n-number of ones counted in the x-bit bit mask. At Step 122, a second request is sent to the second network device including the n-bit random number for a (x-n) bit random number where n is less than or equal to x. At Step 124, a second response is received on the first network device including a (x-n) bit random number. At Step 126, a complete x-bit digital cookie is generated on the first network device using the (x-n) bit random number, the n-bit random number and the x-bit bit mask. The complete x-bit digital cookie generated by the first network device is not in use on the computer network.

In one exemplary embodiment of the present invention, the complete digital cookie is derived at Step 126 by placing the first network device's n-bit random number (i.e., both ones and zero) in bit positions with values of one in the x-bit bit mask. The second network device's (x-n) bit random number bit values (i.e., both ones and zeros) are placed in bit positions with values of zeros in the x-bit bit mask, where n is less than or equal to x. However, the present invention is not limited to this embodiment and other methods could also be used to derive the digital cookie at Step 126.

In one exemplary embodiment of the present invention, the value of n is statically determined. In another exemplary embodiment of the present invention, the value of n is randomly generated. In either embodiment, n is less than or equal to x when an x-bit bit mask is used. The value of n is then used to randomly set bit positions for n-number of bits in the x-bit bit mask to a value of one. The value of n is also used to randomly set bit positions for (x-n) number of bits in the x-bit bit mask to value of zero.

In another exemplary embodiment of the present invention, n-number of random numbers are generated to select n-number of bit positions for n-number of bits to set to a value of one in an x-bit bit mask. In another embodiment of the present invention, the value of n is randomly generated, and n-number of random numbers are generated to select bit positions for the n-number of bits to set to value of one. In such an embodiment, the n-number of bit positions for the n-number of bits in the x-bit bit mask are randomly selected. In yet another embodiment of the present invention, an x-bit random number is generated for an x-bit bit mask. The bit positions to set to values of ones and zeros in the x-bit bit mask are determined from a binary representation of the x-bit random number. However, the present invention is not limited to these embodiments, and virtually any combination of random number generations can be used to random numbers for an x-bit digital cookie.

In one exemplary embodiment of the present invention, Method 112 is used with the initiator 68 (FIG. 3) and the DNAT/RSIP gateway 26 (FIG. 1) to create 64-bit digital cookies that can be used for IKE. However, the present invention is not limited to this embodiment and other network devices and digital cookie sizes could also be used.

For the sake of simplicity, Method 112 is illustrated using a 4-bit cookie with n=2, so 2-bit random numbers are used. However, the present invention is not limited to such an embodiment, and this embodiment is exemplary only to illustrate the use of Method 112 without having to illustrate bit masks with a large number of bits.

In such an embodiment, the initiator 68 and the DNAT/RSIP gateway 26 (FIG. 6) generate a 4-bit digital cookie using 2-bit random numbers. At Step 114, a first request is sent from the initiator 68 to the DNAT/RSIP gateway 26 for a 4-bit bit mask. At Step 116, a first response is received on the initiator 68 from the DNAT/RSIP gateway 26 including a 4-bit bit mask template. The 4-bit bit mask template has 2-bits randomly set to a value of one and remaining (4–2) or 2-bits, set to a value of zero. (e.g., 1010). At Step 118, the bits set to a value of one in the 4-bit bit mask are counted on the first network device (e.g., two). At Step 120, a 2-bit random number is generated on the initiator 68 based on the 2 ones counted in the 4-bit bit mask (e.g., 10). At Step 122, a second request is sent to the DNAT/RSIP gateway 26 including the first 2-bit random number. At Step 124, a second response is received on the initiator 68 including a second 2-bit random number (e.g., 01). At Step 126, a complete digital cookie is derived using the first 2-bit random number (10), the second 2-bit random number (e.g., 01) and the 4-bit bit mask (e.g., 1010). The resulting complete 4-bit digital cookie has a value of 1001 as is illustrated below.

In one exemplary embodiment of the present invention, the complete 4-bit digital cookie is derived at Step 116 by placing the initiator's 68 2-bit random number (e.g., 10) in bit positions with a value of one in the 4-bit bit mask (e.g., 1010). Table 2 illustrates this action.

TABLE 2

1. First bit-1 from 2-bit bit mask (10) (left-to-right) is placed in position 1 (left-to-right) of the 4-bit bit mask 1010 leaving an intermediate result of 1010.
2. Second bit-0 from the bit mask (10) (left-to-right) is placed in position 3 (left-to-right) of the 4-bit bit mask 1010 leaving an intermediate result of 1000.

The DNAT/RSIP gateway's 26 2-bit random number (e.g., 01) is placed in the bit positions bits with values of zero in the 4-bit bit mask (e.g., 1010, the original bit mask). Table 3 illustrates this action.

TABLE 3

3. First bit-0 from 2-bit bit mask (01) (left-to-right) is placed in position 2 (left-to-right) of the original 4-bit bit mask.
4. Second bit-1 from the bit mask (01) (left-to-right) is placed in position 4 (left-to-right) of the original 4-bit bit mask leaving a final result of 1001.

Tables 2 and 3 illustrate replacing bits from left-to-right in the bit mask. However, the present invention is not limited to a left-to-right replacement and other replacement orders can also be used (e.g., right-to-left, another pattern).

The initiator 68 can use the generated complete 4-bit digital cookie 1001 in an IKE anti-clogging digital cookie exchange (e.g., FIG. 3). By checking all of the digital cookies in use on the first private computer network-x 12, and sending the initiator 68 the second 2-bit random number of 01, the DNAT/RSIP server 26 has allowed the initiator 68 to create a complete 4-bit digital cookie, using the first 2-bit random number and the second 2-bit random number, that is not already in use on network 12. The initiator 28 can create the complete 4-bit digital cookie that is not in use on network 12.

Distributed Generation of Unique Random Numbers from a Server Network Device

Method 112 (FIG. 6) illustrates a method for distributed generation of unique random numbers from a client network device. FIG. 7 illustrates a method for distributed generation of unique random numbers from a server network device.

Figure 7B:
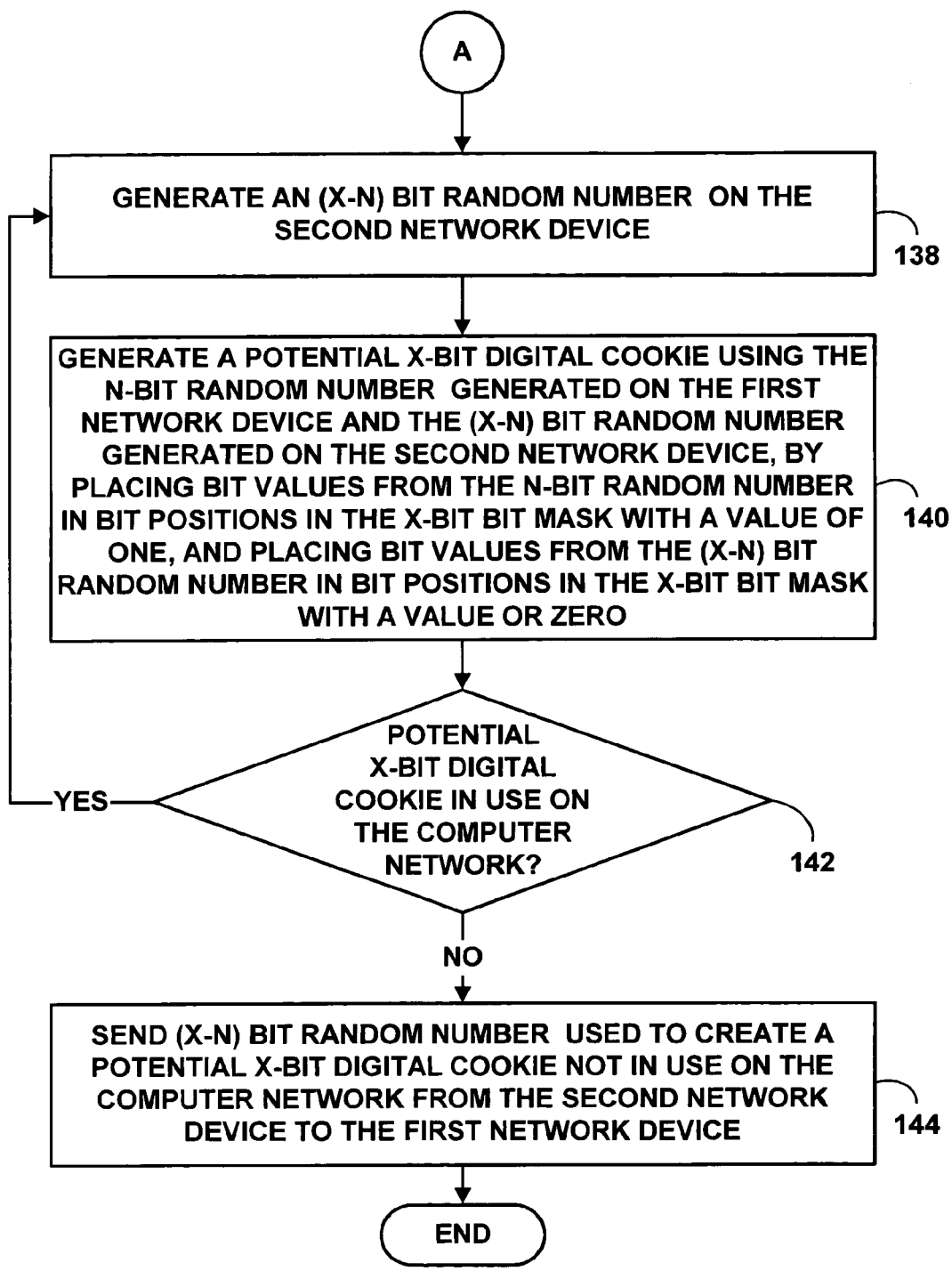

FIGS. 7A and 7B are a flow diagram illustrating a Method 128 for distributed generation of unique random numbers from a server network device. In FIG. 7A, at Step 130, a list of complete digital cookies in use on the computer network is maintained on a second network device. At Step 132, a x-bit bit mask template is generated on a second network device, wherein the x-bit bit mask template has n-bits randomly set to a value of one and remaining (x-n) bits randomly set to value of zero, where n is less than or equal to x. At Step 134, the x-bit bit mask template is sent to a first network device on the computer network. At Step 136, a request is received from the first network device to request a (x-n) bit random number from the second network device, where n is less than or equal to x. The first message includes an n-bit random number.

In FIG. 7B, a loop is entered to repeat steps 138, 140, 142 until a potential x-bit digital cookie is generated that is not in use on the computer network. At Step 138, an (x-n) bit random number is generated on the second network device. At Step 140, a potential x-bit digital cookie is generated on the second network device using the n-bit random number generated on the first network device and the (x-n) bit random number generated on the second network device. Step 140 includes placing values of bits from the n-bit random number generated on the first network device in bit positions with a value of one in the x-bit bit mask, thereby creating a partial digital cookie. Step 140 further includes placing values of bits from a (x-n) bit random number generated on the second network device in bit positions with a value of zero in the x-bit bit mask, thereby completing generation of a potential x-bit digital cookie. At Step 142, the potential x-bit digital cookie is compared with complete digital cookies from the list of complete digital cookies maintained on the first network device that are in use on the computer network. If the potential x-bit digital cookie is not in use, at Step 144, the (x-n) bit random number for the potential x-bit digital cookie that is not in use on the computer network is sent to the first network device. The first network device then generates an identical final digital cookie in a similar manner as was described for the second network device (e.g., the first network device executes Step 140).

The second network device can create an x-bit mask with between zero and x-bits (inclusive) set. When zero bits are set to one, the second network device determines the entire digital cookie, and when x-bits are set to one, the first network device determines the entire cookie.

In one exemplary embodiment of the present invention, 64-bits are used for the x-bit bit mask and the complete x-bit digital cookie. The first network device is initiator 68 and the second network device is a DNAT/RSIP gateway 26. However, the present invention is not limited to such an embodiment and other size bit masks and digital cookies and network devices can also be used.

For the methods and system described herein, the random numbers generated are generated with any suitable random number generator known in the art. The methods and system described herein is independent of the random number generator, and specifies a simple protocol (e.g., 4 messages) for communication between the entities. Preferred embodiments of the present invention operate under the constraint that the generated numbers must be unique, since the resulting digital cookie may be used to establish a secure communication session (e.g., as an anti-clogging digital cookie with IKE) or be used for routing.

The methods and system described herein may provide at least the following advantages: (1) the method and system can be used as a general scheme for distributed generation of unique random numbers; (2) the three cookie generation requirements proposed by Karn (Table 1) are not violated; (3) a DNAT/RSIP gateway 26 can create an x-bit bit mask template with between zero and x-bits (inclusive) set. When zero bits are set to one, the DNAT/RSIP gateway determines the entire digital cookie, and when x-bits are set to one, the initiator 68 determines the entire digital cookie; (4) virtually any well-known and trusted non-parallel or parallel random number generator can be used by the initiator 68 and the DNAT/RSIP gateway, such as the many linear-congruential pseudo-random number generators in use today; (5) a DNAT/RSIP gateway 26 can specify a bit mask that will minimize the probability of a digital cookie collision. The entropy of the generated x-bit digital cookie is x-bits.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used and visa-versa.

In view of the wide variety of embodiments to which the principles of the invention can be applied, it should be understood that the illustrative embodiments are exemplary only, and should not be taken as limiting the scope of the present invention. For example, the steps of the flow diagrams may be taken in sequences other than those described, and more or fewer elements or component may be used in the block diagrams. The claims should not be read as limited to the described order or elements unless stated to that effect. Therefore, all embodiments that come within the scope and spirit of the following claims and equivalents thereto are claimed as the invention.

We claim:

1. In a computer network with a plurality of network devices, a method for distributed generation of unique random numbers for digital cookies, comprising the steps of:
   generating a first portion of a x-bit digital cookie on a first network device on the computer network based on an x-bit bit mask template sent to the first network device from a second network device on the computer network;
   sending a first message to request a second portion of the x-bit digital cookie from the second network device, wherein the first message includes the first portion of the x-bit digital cookie;
   receiving a first response from the second network device wherein the first response includes a second portion of the x-bit digital cookie from the second network device, and wherein the second network device generates potential x-bit digital cookies using the first portion of the x-bit digital cookie from the first network device and a second portion of the x-bit digital cookie generated on the second network device until the second network device generates a potential x-bit digital cookie that is not in use on the computer network;
   generating a complete x-bit digital cookie on the first network device using the first portion of the x-bit digital cookie and the second portion of the x-bit digital cookie, wherein the complete x-bit digital cookie is not in use on the computer network.

2. A computer readable medium having stored therein instructions for causing a central processing unit to execute the method of claim 1.

3. The method of claim 1 further comprising:
   sending the complete x-bit digital cookie in a plurality of messages used to a establish a secure connection between the first network device on the computer network and third network device on a remote computer network.

4. The method of claim 3, wherein the plurality of messages include a plurality of Internet Key Exchange protocol messages.

5. The method of claim 1 wherein the step of generating a first portion of an
   x-bit digital cookie includes generating a n-bit random number, wherein the number-n is determined by counting n-number of bits set to a value of one in the x-bit bit mask sent to the first network device by the second network device.

6. The method of claim 1 wherein the second portion of the bit mask is an (x-n) bit random number generated on the second network device, wherein n is less than or equal to x.

7. The method of claim 1 wherein the x-bit bit mask template is a 64-bit, bit mask template.

8. The method of claim 1 wherein the step of generating a complete x-bit digital cookie on the first network device includes generating a complete x-bit digital cookie on the first network device by placing values of bits from the first portion of the x-bit digital cookie in bit positions with a value of one using the x-bit bit mask template, and by placing values of bits from the second portion of the x-bit digital cookie in bit positions with a value of zero using the x-bit bit mask template.

9. The method of claim 1 wherein the second network device is any of a Distributed Network Address Translation gateway or a Realm Specific Internet Protocol gateway.

10. In a computer network with a plurality of network devices, a method for distributed generation of unique random numbers for digital cookies, comprising the steps of:

maintaining a list of complete digital cookies in use on the computer network on a second network device;

generating a x-bit bit mask template on a second network device, wherein the x-bit bit mask has n-bits randomly set to a value of one and remaining (x-n) bits randomly set to value of zero wherein n is less than or equal to x;

sending the x-bit bit mask template to a first network device on the computer network;

receiving a request from the first network device to request a second portion of a x-bit digital cookie from the second network device, wherein the first message includes an first portion of the x-bit digital cookie;

(a) generating a second portion of a x-bit digital cookie on the second network device;

(b) generating a potential x-bit digital cookie on the second network device using the first portion of the x-bit digital cookie generated on the first network device and the second portion of the x-bit digital cookie generated on the second network device;

(c) comparing the potential x-bit digital cookie with complete digital cookies from the list of complete digital cookies maintained on the second network device that are in use on the computer network;

repeating steps (a), (b) and (c) until a potential x-bit digital cookie is generated that is not in use on the computer network; and sending the second portion of the x-bit digital cookie for the potential x-bit digital cookie that is not in use on the computer network to the first network device, wherein the first network device uses the first portion of the x-bit digital cookie and the second portion of the x-bit digital cookie to create a complete x-bit digital cookie that is not in use on the computer network.

11. A computer readable medium having stored therein instructions for causing a central processing unit to execute the method of claim 10.

12. The method of claim 10 wherein the first portion of the x-bit digital cookie includes an n-bit random number, wherein the n-bits were determined by counting a number of bits set to the value of one in the x-bit bit-mask sent to the first network device and generating an n-bit random number on the first network device.

13. The method of claim 10 wherein step (a) includes generating a (x-n) bit random number on the second network device, wherein the first portion of the x-bit digital cookie from the first network device includes n-bits.

14. The method of claim 10 wherein step (b) includes placing values of bits from a n-bit first portion of the x-bit digital cookie generated on the first network device in bit positions with a value of one in the x-bit bit mask, and placing values of bits from a (x-n) bit second portion of the x-bit digital cookie generating on the second network device in bit positions with a value of zero in the x-bit bit mask.

15. The method of claim 10 wherein the x-bit bit mask template is a 64-bit, bit mask template.

16. The method of claim 10 wherein the second network device is any of a Distributed Network Address Translation gateway or a Realm Specific Internet Protocol gateway.

17. In a computer network with a plurality of network devices, a method for distributed generation of unique random numbers for digital cookies, comprising the steps of:

sending a first request from a first network device to a second network device for an x-bit bit mask template;

receiving a first response on the first network device from the second network device including a x-bit bit mask template, wherein the x-bit bit mask template has n-bits randomly set to a value of one and remaining (x-n) bits randomly set to a value of zero, wherein n is less than or equal to x;

counting n-number of ones in the x-bit bit mask template on the first network device;

generating an n-bit random number on the first network device based on the n-number of ones counted in the x-bit bit mask;

sending a second request to the second network device including the n-bit random number for a (x-n) bit random number;

receiving a second response from the second network device including a (x-n) bit random number; and creating a complete digital cookie using the (x-n) bit random number, the x-bit random number and the x-bit bit mask, wherein the complete digital cookie is not in use on the computer network.

18. A computer readable medium having stored therein instructions for causing a central processing unit to execute the method of claim 17.

19. The method of claim 17 wherein the x-bit bit mask template is a 64-bit bit mask template.

20. The method of claim 17 wherein the second network device is any of a Distributed Network Address Translation gateway or a Realm Specific Internet Protocol gateway.

21. The method of claim 17 further comprising:

sending the complete x-bit digital cookie in a plurality of messages used to a establish a secure connection between the first network device on the computer network and third network device on a remote computer network.

22. The method of claim 21 wherein the plurality of messages include a plurality of Internet Key Exchange protocol messages.

23. In a computer network with a plurality of network devices, a method for distributed generation of unique random numbers for digital cookies, comprising the steps of:

maintaining a list of complete digital cookies in use on the computer network on a second network device;

generating a x-bit bit mask template on a second network device, wherein the x-bit bit mask has n-bits randomly set to a value of one and remaining (x-n) bits randomly set to value of zero, wherein n is less than or equal to x;

sending the x-bit bit mask template to a first network device on the computer network;

receiving a request from the first network device to request an (x-n) bit random number for an x-bit digital cookie from the second network device, wherein the first message includes an n-bit random number;
(a) generating a (x-n) bit random number on the second network device;
(b) generating a potential x-bit digital cookie on the second network device using the n-bit random number generated on the first network device and the (x-n) bit random generated on the second network device, wherein the potential x-bit digital cookie is generated by placing values of bits from the n-bit random number generated on the first network device in bit positions with a value of one in the x-bit bit mask, and placing values of bits from a (x-n) bit random number generating on the second network device in bit positions with a value of zero in the x-bit bit mask;
(c) comparing the potential x-bit digital cookie with complete digital cookies from the list of complete digital cookies maintained on the first network device that are in use on the computer network;
repeating steps (a), (b) and (c) until a potential x-bit digital cookie is generated that is not in use on the computer network;
sending the (x-n) bit random number used to generate the potential x-bit digital cookie that is not in use on the computer network to the first network device, wherein the first network device uses the n-bit random number and the (x-n) bit random number to create a complete x-bit digital cookie that is not in use on the computer network.

24. A computer readable medium having stored therein instructions for causing a central processing unit to execute the method of claim 23.

25. The method of claim 23 wherein the x-bit bit mask template is a 64-bit, bit mask template.

26. The method of claim 23 wherein the second network device is any of a Distributed Network Address Translation gateway or a Realm Specific Internet Protocol gateway.

27. The method of claim 23 further comprising generating a complete x-bit digital cookie on the first network device using the n-bit random number, the (x-n) bit random number and the x-bit bit mask template.

* * * * *